(12) United States Patent
Wakitani et al.

(10) Patent No.: US 7,116,065 B2
(45) Date of Patent: Oct. 3, 2006

(54) ELECTRIC VEHICLE

(75) Inventors: Tsutomu Wakitani, Wako (JP); Yoshihiko Yamagishi, Wako (JP); Norikazu Shimizu, Wako (JP)

(73) Assignee: Honda Motor Co., Ltd., (JP)

( * ) Notice: Subject to any disclaimer, the term of this patent is extended or adjusted under 35 U.S.C. 154(b) by 167 days.

(21) Appl. No.: 10/965,148

(22) Filed: Oct. 14, 2004

(65) Prior Publication Data
US 2005/0088123 A1 Apr. 28, 2005

(30) Foreign Application Priority Data
Oct. 28, 2003 (JP) ............... 2003-367382
Nov. 11, 2003 (JP) ............... 2003-381362

(51) Int. Cl.
*H02P 5/00* (2006.01)

(52) U.S. Cl. ............... 318/67; 318/567; 318/560

(58) Field of Classification Search ............... 318/67, 318/567, 560; 701/96; 180/170
See application file for complete search history.

(56) References Cited

U.S. PATENT DOCUMENTS 6,564,137 B1 * 5/2003 Minowa et al. ............... 701/70
6,597,981 B1 * 7/2003 Nishira et al. ............... 701/96
2004/0036601 A1 * 2/2004 Obradovich ............... 340/540

FOREIGN PATENT DOCUMENTS

| JP | 57078855 | 5/1982 |
| JP | 57085505 | 5/1982 |
| JP | 01271317 | 10/2001 |

* cited by examiner

*Primary Examiner*—Karen Masih
(74) *Attorney, Agent, or Firm*—Adams & Wilks

(57) ABSTRACT

An electric vehicle in which left and right electric motors respectively driving left and right transporting parts are controlled by a control part and particular turning control of the electric motors is carried out when the electric vehicle turns. The electric vehicle has a left and right pair of push-button turn switches. When one of the turn switches is operated, the control part selects a pattern from multiple preset deceleration patterns and decelerates the motor on the inside of the turn, which corresponds to the turn switch being operated, on the basis of this deceleration pattern. The electric vehicle makes turns and returns to straight-line travel optimally and smoothly and can be operated easily by an operator with no skill or experience.

15 Claims, 21 Drawing Sheets

ELECTRIC VEHICLE

FIELD OF THE INVENTION

This invention relates to an electric vehicle in which left and right transporting parts are respectively driven by left and right electric motors.

BACKGROUND OF THE INVENTION

Electric vehicles in which left and right transporting parts are driven by left and right electric motors are known from for example JP-A-57-78855, JP-A-57-85505 and JP-A-2001-271317. When transporting parts are driven by electric motors like this, there is the advantage that the electric vehicle can be made relatively maneuverable.

A snow-clearing machine disclosed in JP-A-2001-271317 will now be described briefly on the basis of FIG. 19 hereof.

In FIG. 19, a snow-remover 200 has on a machine body 201 a working part 204 made up of an auger 202 and a blower 203; an engine 205 for driving the working part 204; left and right transporting parts 206, 206 consisting of crawlers; left and right electric motors 207, 207 for driving these transporting parts 206, 206; a generator 209, driven by the engine 205, for supplying electrical power to a battery 208 and the electric motors 207, 207; and a control part 211 for controlling the electric motors 207, 207.

Some of the output of the engine 205 is used to drive the generator 209, and the electrical power obtained is supplied to the battery 208 and the left and right electric motors 207, 207. The remainder of the output of the engine 205 is allocated to rotating the working part 204 via an electromagnetic clutch 212. Thus, in this snow-remover 200, the working part 204 is driven by the engine 205 and the transporting parts 206, 206 are driven by the electric motors 207, 207.

Now, an ordinary snow-remover 200 has left and right operating handles extending rearward from the rear part of the machine body 201 and has grips on the ends of these left and right operating handles. Brake levers (turning levers) are provided beneath these grips, and by gripping one of these brake levers it is possible to make the electric vehicle 200 turn by decelerating the electric motor 207 corresponding to the gripped lever, that is, the electric motor driving the transporting part constituting the turning center (hereinafter, 'the motor on the inside of the turn').

However, because the turning described above is lever-controlled, the degree of deceleration of the motor 207 on the inside of the turn varies with the degree of gripping of the lever. And because it requires a certain amount of skill in turning control to make the snow-remover 200 turn in accordance with the turning operation feel of the operator while keeping the snow-remover 200 traveling through the turn, there has been room for improvement.

Also, in the snow-remover 200 described above, because levers are used as the turning control means, in each turning control means an error arises in the relationship between the lever control level and the corresponding control signal level. The work of adjusting for this error is troublesome, and there has been a need for adjustment of the turning control means to be rendered unnecessary.

SUMMARY OF THE INVENTION

The present invention provides an electric vehicle including: a machine body; left and right transporting parts provided on the machine body for propelling the machine body; left and right push-button type turn switches; left and right electric motors for respectively driving the left and right transporting parts, of which electric motors the one corresponding to whichever of the left and right turn switches is being operated during a turn will be called the motor on the inside of the turn and the other will be called the motor on the outside of the turn; a control part for controlling the left and right electric motors; and a hand-operated target speed adjusting member for producing a target travel speed command for the left and right electric motors, wherein the control part has inside motor deceleration pattern selecting means for, when receiving an operation signal from the left or right turn switch, selecting one deceleration pattern from among multiple different preset deceleration patterns for the motor on the inside of the turn on the basis of a target travel speed from the target speed adjusting member as of when said left or right turn switch was operated, and inside motor deceleration control means for, only as long as said turn switch is being operated, executing deceleration control of the motor on the inside of the turn using a deceleration control value based on the selected inside motor deceleration pattern.

Thus, in an electric vehicle according to this invention, just by simply continuously pressing a left or right bush-button turn switch it is possible to decelerate the corresponding motor on the inside of the turn in accordance with a deceleration pattern corresponding to the target travel speed from the target speed adjusting member as of immediately before the turn. Consequently, compared to a case where the degree of deceleration of the electric motor on the inside of the turn is adjusted by gripping a lever as in handle-lever type turning control means of related art, extremely simple turning control is possible. The operator can perform turning control easily without needing any skill, and the turning controllability of the vehicle is increased.

Furthermore, the electric vehicle can be turned in accordance with the turning control feeling of the operator. For example, the electric vehicle can be turned with the same turning control feeling as when handle-lever type turning control means is operated. Because deceleration can be effected in accordance with a deceleration pattern corresponding to any pre-turn target travel speed, the electric vehicle can be turned in an optimal state.

Also, in an electric vehicle according to the invention, the motor on the inside of the turn can be deceleration-controlled with a push-button type turn switch. Because the only operating force required of the operator is the force needed to operate the push-button switch, and the operating force is lightened, the effort of the operator is reduced.

Also, because the turning control means is a push-button type turn switch, its construction can be simple compared to handle-lever type turning control means of related art, and adjustment of a lever control level and a control signal level corresponding to this are also unnecessary.

The target travel speed as of immediately before the turn is set to an optimal speed by the operator himself, taking into account travel conditions such as the road surface and considering the present ground-covering ability of the electric vehicle. On the basis of such an optimal target travel speed, the electric vehicle can be turned while being decelerated in accordance with a motor deceleration pattern for use on turning, and the ground-covering ability of the electric vehicle on turning increases.

Preferably, the control part of the invention further includes inside motor acceleration control means for, from when it receives a control-release signal of when the left or right turn switch was released, executing acceleration control of the motor on the inside of the turn using an acceleration control value based on a preset motor acceleration pattern, and the acceleration control value is a value obtained by adding a fixed value to a minimum value of the acceleration control value that would otherwise have been assumed at the time when the control-release signal was received.

That is, in an electric vehicle according to the invention, by acceleration control of the motor on the inside of the turn being executed from when the turn switch is released using an acceleration control value, the electric vehicle can be switched to straight-line travel. In this case, a value obtained by adding a fixed value to the minimum value of the acceleration control value is made the acceleration control value of when the turn switch is released. That is, at the point in time when the switch to straight-line travel is made, the acceleration control value applied to the motor on the inside of the turn is raised at a stroke. As a result the motor on the inside of the turn can be accelerated rapidly, and the speed difference between speed of the motor on the outside of the turn and the speed of the motor on the inside of the turn is quickly eliminated. Because of this, the electric vehicle can be switched from turning travel to straight-line travel rapidly.

In particular, when the left and right transporting parts are crawlers, they have a strength of ground contact and size of driving force peculiar to crawlers. Because of this, when the electric vehicle is operated to shift from turning travel to straight-line travel, it does not readily do so rapidly. With respect to this, in an electric vehicle according to this invention, by the motor on the inside of the turn being accelerated at a stroke, the speed difference between the left and right crawlers is rapidly eliminated and the switch to straight-line travel can be made quickly.

Preferably, an electric vehicle according to the invention further includes a working part and a work switch for on/off-controlling this working part, the resistance to travel encountered by the left and right transporting parts differing depending on whether the working part is on or off, and the multiple inside motor deceleration patterns differ also according to whether the working switch is on or off, and the control part selects one pattern from among the multiple inside motor deceleration patterns on the basis of a combination of an on/off-signal from the work switch and the target travel speed as of when the left or right turn switch was operated.

For example, in the case of an electric vehicle in which the travel resistance of the transporting parts varies with whether the working part is on or off, as in the case of a snow-remover, it is possible to perform finer turning control by making the multiple inside motor deceleration patterns ones which differ also with whether the work switch is on or off.

Preferably, the control part further includes outside motor deceleration pattern selecting means for, when receiving an operation signal from the left or right turn switch, selecting one pattern from among multiple different preset deceleration patterns for the motor on the outside of the turn on the basis of the target travel speed as of when said left or right turn switch was operated, and outside motor deceleration control means for, only as long as said turn switch is being operated, executing deceleration control of the motor on the outside of the turn using a deceleration control value based on the selected outside motor deceleration pattern.

That is, when the electric vehicle is turned, an outside motor deceleration pattern is selected on the basis of the target travel speed from the target speed adjusting member as of when the turn switch was operated, and the motor on the outside of the turn is decelerated on the basis of that deceleration pattern. Consequently, the electric vehicle turns more smoothly and it is possible to provide a turning characteristic suited to the nature of the electric vehicle.

The invention also provides an electric vehicle including: a machine body; left and right transporting parts provided on the machine body for propelling the machine body; left and right push-button type turn switches; left and right electric motors for respectively driving the left and right transporting parts, of which electric motors the one corresponding to whichever of the left and right turn switches is being operated during a turn will be called the motor on the inside of the turn and the other will be called the motor on the outside of the turn; and a control part for controlling the left and right electric motors, wherein the control part has inside motor deceleration pattern selecting means for, when receiving an operation signal from the left or right turn switch, selecting one deceleration pattern from among multiple different preset deceleration patterns for the motor on the inside of the turn on the basis of the actual speed of the motor on the inside of the turn as of when the left or right turn switch was operated, and inside motor deceleration control means for, only as long as said turn switch is being operated, executing deceleration control of the motor on the inside of the turn using a deceleration control value based on the selected inside motor deceleration pattern.

In this electric vehicle of the invention, just by simply continuously pressing a left or right bush-button turn switch it is possible to decelerate the corresponding motor on the inside of the turn in accordance with a deceleration pattern corresponding to the actual speed of that motor as of immediately before the turn. The actual speed of the motors as of immediately before the turn is set to an optimal speed by the operator himself, taking into account travel conditions such as the road surface and considering the present ground-covering ability of the electric vehicle. On the basis of such an optimal actual motor speed, the motor on the inside of the turn can be decelerated as the electric vehicle is turned. As a result, the ground-covering ability of the electric vehicle on turning increases.

Preferably, the control part of the invention further includes inside motor acceleration control means for, from when it receives a control-release signal of when the left or right turn switch was released, executing acceleration control of the motor on the inside of the turn using an acceleration control value based on a preset motor acceleration pattern, and the acceleration control value is a value obtained by adding a fixed value to a minimum value of the acceleration control value that would otherwise have been assumed at the time when the control-release signal was received.

Also, preferably, this electric vehicle further includes a working part and a work switch for on/off-controlling this working part, the resistance to travel encountered by the left and right transporting parts differing depending on whether the working part is on or off, and the multiple inside motor deceleration patterns differ also according to whether the working switch is on or off, and the control part selects one pattern from among the multiple inside motor deceleration patterns on the basis of a combination of an on/off-signal from the work switch and the actual speed of the motor on the inside of the turn as of when the left or right turn switch was operated.

Preferably, the control part further includes outside motor deceleration pattern selecting means for, when receiving an operation signal from the left or right turn switch, selecting one pattern from among multiple different preset deceleration patterns for the motor on the outside of the turn on the basis of the actual speed of the motor on the outside of the turn as of when said left or right turn switch was operated, and outside motor deceleration control means for, only as long as said turn switch is being operated, executing deceleration control of the motor on the outside of the turn using a deceleration control value based on the selected outside motor deceleration pattern.

In this case, because when the electric vehicle is turned an outside motor deceleration pattern is selected on the basis of the actual speed of the motor on the outside of the turn as of when the turn switch was operated and on the basis of that deceleration pattern the motor on the outside of the turn is also decelerated, the electric vehicle can be turned more smoothly.

BRIEF DESCRIPTION OF THE DRAWINGS

Certain preferred embodiments of the present invention will be explained in detail below, by way of example only, with reference to the accompanying drawings, in which.

DETAILED DESCRIPTION OF THE PREFERRED EMBODIMENTS

Figure 1:
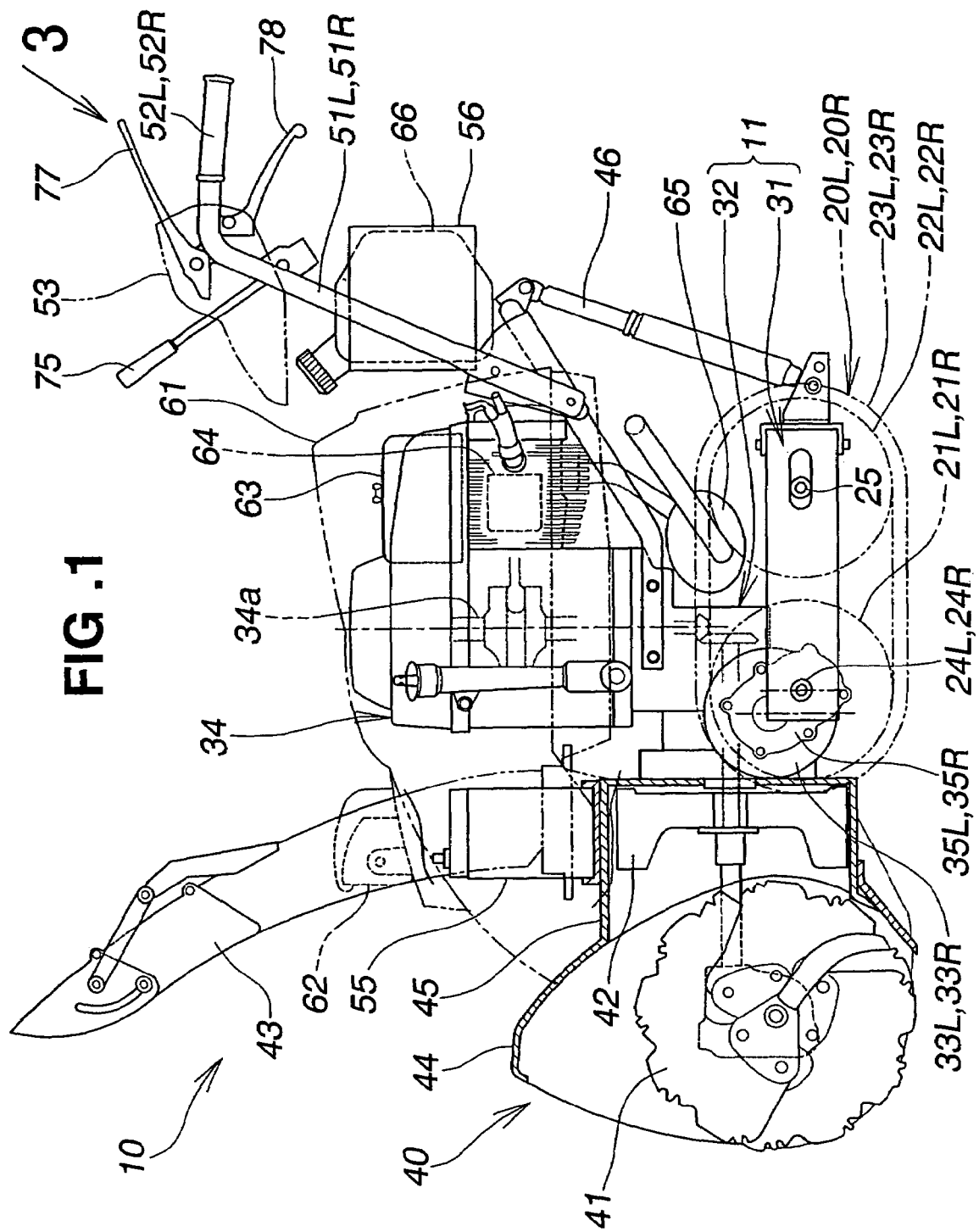
FIG. 1 is side view of a snow-remover according to the invention.

A preferred embodiment of an electric vehicle will now be described, and as a suitable embodiment of an electric vehicle the example of a snow-remover will be used, as shown in the drawings.

Figure 2:
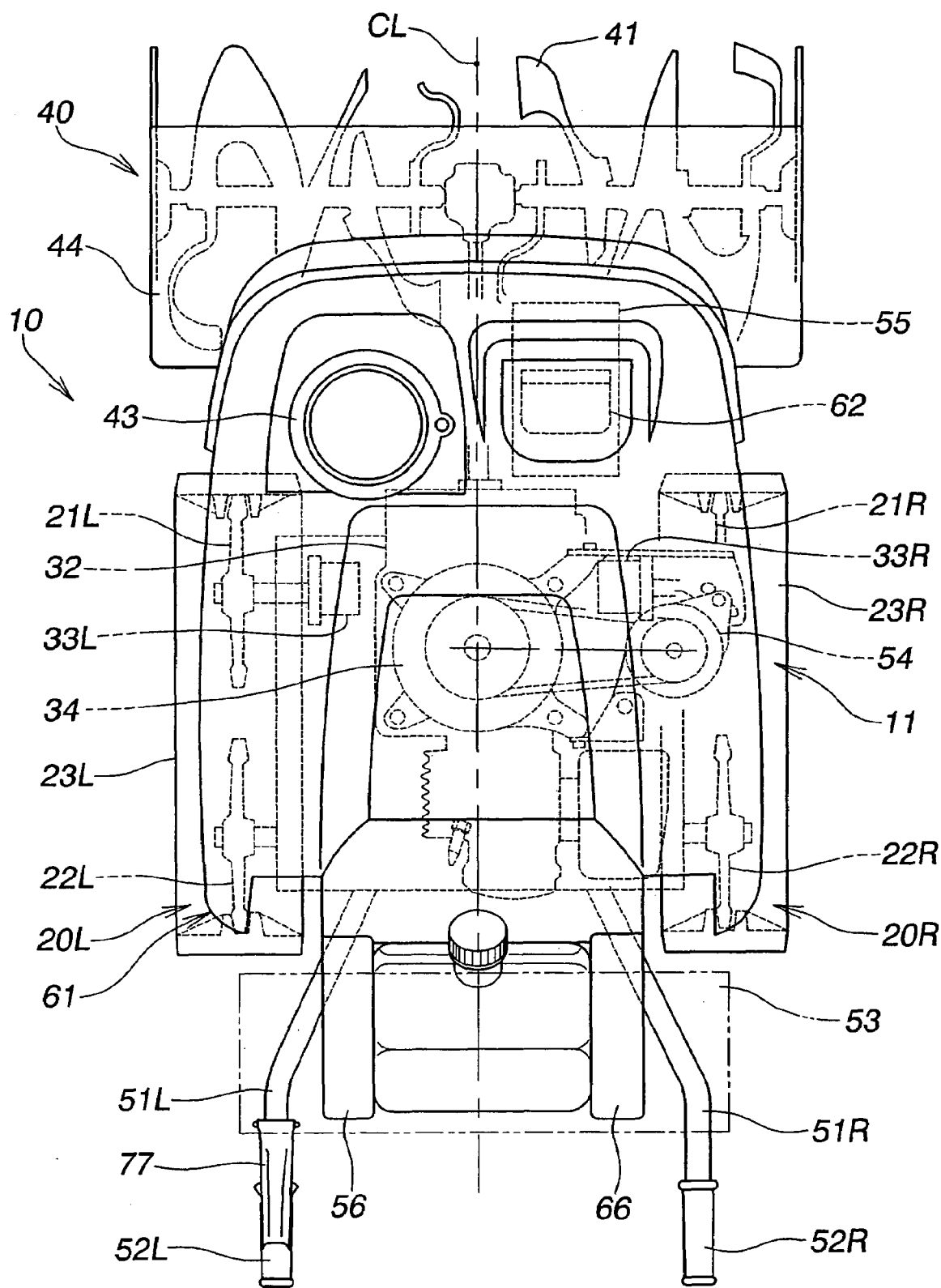
FIG. 2 is a plan view of the snow-remover shown in FIG. 1.

As shown in FIG. 1 and FIG. 2, a snow-remover 10 includes a machine body 11 made up of a transport frame 31 and a transmission case 32.

The transport frame 31 has left and right transporting parts 20L, 20R. The transmission case 32 is attached to the transport frame 31 in such a way that it can swing up and down. Left and right electric motors 33L, 33R are mounted on left and right side parts of the transmission case 32. An engine (internal combustion engine) 34 is mounted on an upper part of the transmission case 32. A snow-removal working part 40 is mounted on the front of the transmission case 32. Left and right operating handles 51L, 51R extend upward and rearward from the top of the transmission case 32. A control panel 53 is provided between the left and right operating handles 51L, 51R.

The snow-remover 10 is a self-propelled, walking-type working machine whose operator walks behind the control panel 53.

The left and right operating handles 51L, 51R have grips 52L, 52R at their ends to be gripped by hands.

It is a characteristic feature of the snow-remover 10 of this invention that the snow-removal working part 40 is driven by the engine 34 and the transporting parts 20L, 20R are driven by the electric motors 33L, 33R. This approach is adopted on the basis of the idea that for control of travel speed, turning control and forward-reverse switching control electric motors are preferable, whereas for the working parts, which are subject to sharp load fluctuations, a more powerful internal combustion engine is appropriate.

The left and right electric motors 33L, 33R are drive sources for propulsion, for driving the left and right transporting parts 20L, 20R via left and right transport transmission mechanisms 35L, 35R.

The left transporting part 20L is a crawler having a crawler belt 23L passing around a front driven wheel 21L and a rear non-driven wheel 22L, and rotates the driven wheel 21L forward and in reverse with the left drive motor 33L.

The right transporting part 20R is a crawler having a crawler belt 23R passing around a front driven wheel 21R and a rear non-driven wheel 22R, and rotates the driven wheel 21R forward and in reverse with the right electric motor 33R.

The transport frame 31 rotatably supports left and right driven wheel axles 24L, 24R and at its rear end supports a non-driven wheel axle 25. The left and right driven wheel axles 24L, 24R are rotating shafts to which the left and right driven wheels 21L, 21R are fixed. The non-driven wheel axle 25 has the left and right non-driven wheels 22L, 22R rotatably attached to it.

The engine 34 is a vertical engine having a crankshaft 34a extending downward, and is a for-working drive source for driving the snow-removal working part 40 by transmitting a driving force thereto via a for-working transmission mechanism housed in the transmission case 32.

The snow-removal working part 40 is made up of an auger 41 at the front, a blower 42 at the rear, a shooter 43 at the top, an auger housing 44 covering the auger 41, and a blower housing 45 covering the blower 42. The auger 41 has an action of collecting snow piled on the ground to the center. The blower 42 receives this snow and blows the snow through the shooter 43 to a desired position beside the snow-remover 10.

A swing drive mechanism 46 adjusts the attitude of the auger housing 44 by swinging the transmission case 32 and the snow-removal working part 40 up and down.

As shown in FIG. 2, The machine body 11 has generator 54 and a battery 55 mounted at its front.

In this way, the snow-remover 10 has a working part 40, such as a snow-removing part, on a machine body 11; an internal combustion engine 34 for driving this working part 40; transporting parts 20L, 20R made up of crawlers and wheels; electric motors 33L, 33R for driving these transporting parts 20L, 20R; a generator 54, driven by the internal combustion engine 34, for supplying electrical power to a battery 55 and the electric motors 33L, 33R; and a control part 56 for controlling the rotation of the electric motors 33L, 33R. The control part 56 is for example disposed below the control panel 53 or built into the control panel 53.

In the drawings, the reference number 61 denotes a cover covering the engine 34; 62 a lamp; 63 an air cleaner; 64 a carburetor; 65 an engine exhaust muffler; and 66 a fuel tank.

Figure 3:
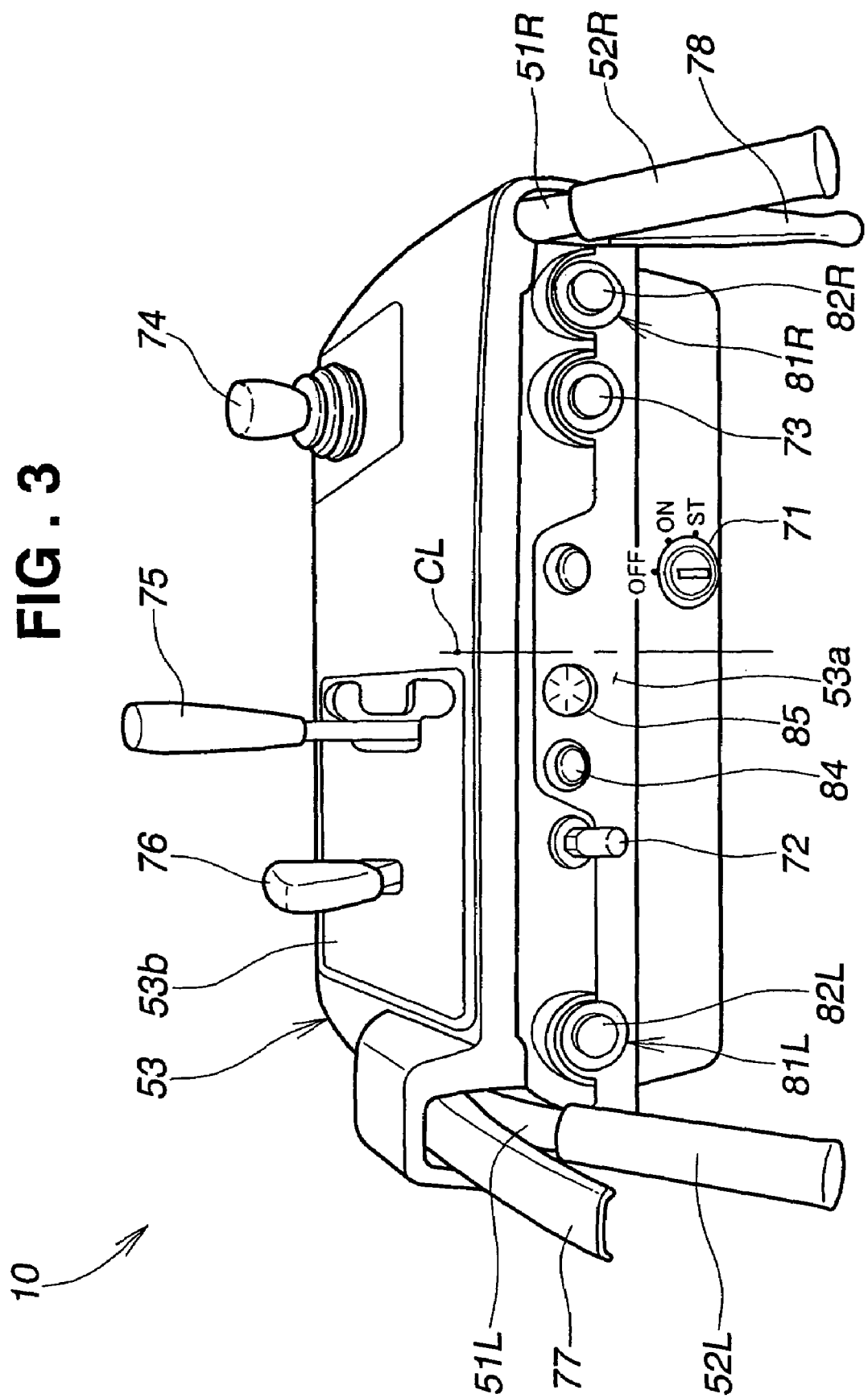
FIG. 3 is a view of a control panel seen in the direction of the arrow 3 in FIG. 1.

As shown in FIG. 3, the control panel 53 has on a rear face 53a thereof (the face on the operator side) a main switch 71, an engine switch 72 and a clutch operating switch 73. On the top face 53b of the control panel 53 are provided, in order from the right side to the left side, a snow-throwing direction adjusting lever 74, a direction/speed lever 75 serving as a direction/speed control member pertaining to the transporting part, and an engine throttle lever 76. Also, the grip 52L is disposed to the left of the control panel 53 and the grip 52R is disposed to the right of the control panel 53.

The left operating handle 51L has a travel preparation lever 77 near to the grip 52L. The right operating handle 51R has an auger housing attitude adjusting lever 78 near to the grip 52R.

Referring to FIG. 1 and FIG. 3, the main switch 71 is an ordinary ignition switch with which it is possible to start the engine 34 by inserting a main key (not shown) into a key insertion hole and turning it, and for example an 'off position OFF', an 'on position ON' and a 'start position ST' are arranged in order clockwise around the key insertion hole.

When the main key is turned to the off position OFF, the engine 34 is stopped and the entire electrical system is shut down. When the main key is turned from the off position OFF to the on position ON, the engine 34 is kept in a stopped state. When the main key is turned to the start position ST, the engine 34 is started. When the main key is turned from the start position ST to the on position ON, the started engine 34 shifts to normal running.

An engine choke 72 is a control member that raises the concentration of the fuel-air mixture when pulled. The clutch operating switch 73 is a push-button switch for turning on and off the auger 41 and the blower 42, that is, a switch for on/off-controlling the snow-removal working part 40. Hereinafter, the clutch operating switch 73 will for convenience be referred to as 'the auger switch 73'.

The snow-throwing direction adjusting lever 74 is a lever operated to change the direction of the shooter 43.

The direction/speed lever 75 is a forward/reverse speed adjusting lever for controlling the travel speed of the electric motors 33L, 33R and switching between forward and reverse by controlling the direction of rotation of the electric motors 33L, 33R.

Figure 4:
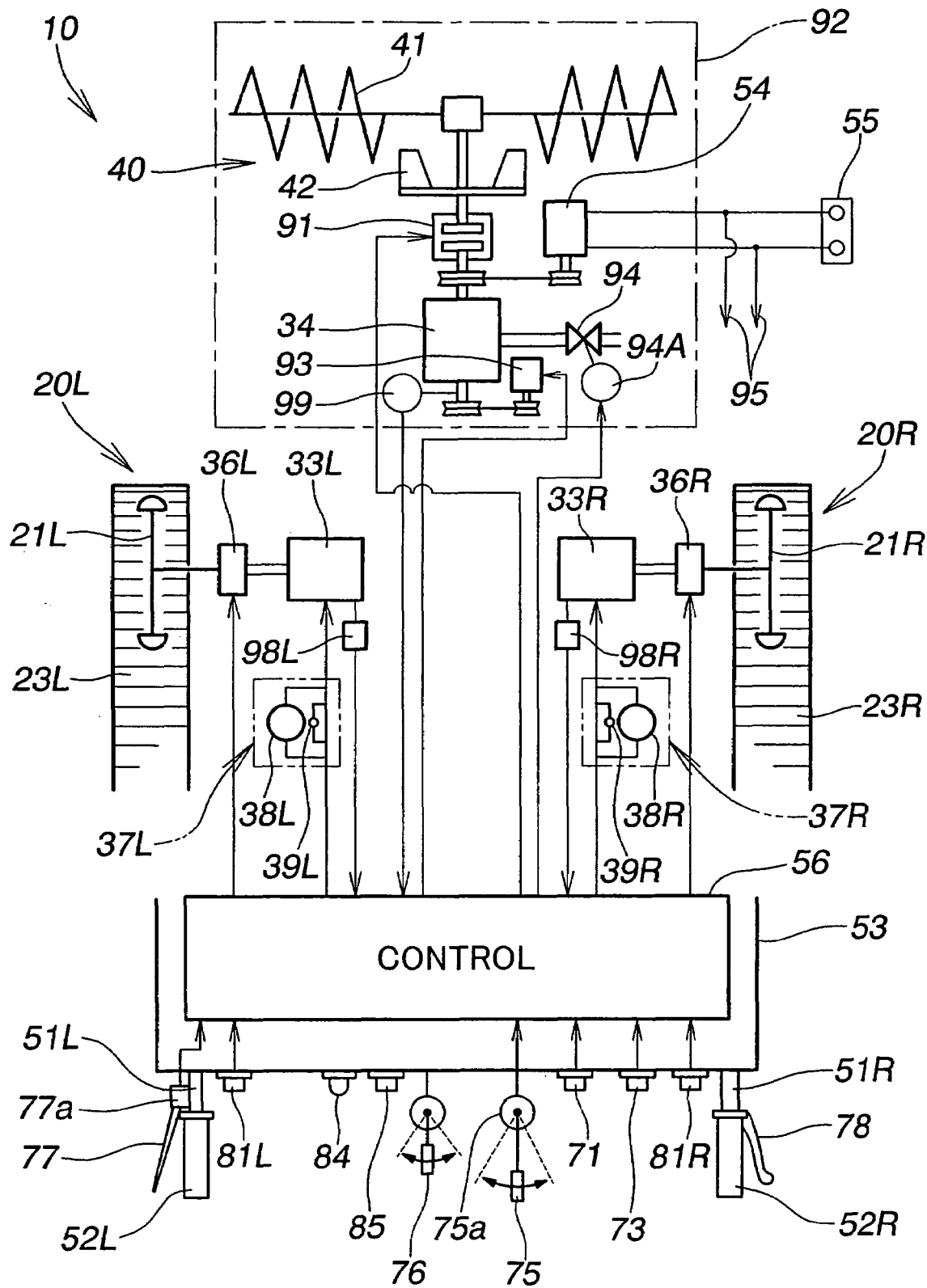
FIG. 4 is a view showing the control system of a snow-remover according to the invention.

The engine throttle lever 76 controls the speed of the engine 34 by adjusting the aperture of a throttle valve (see reference number 94 in FIG. 4).

The travel preparation lever 77 is a travel preparation member that acts on switching means (see reference numeral 77a in FIG. 4) and turns the switching means off under a pulling action of a return spring when in the free state shown in the figure. When the left hand of the operator grips the travel preparation lever 77 and moves it toward the grip 52L, the switching means turns on. In this way, the switching means detects whether or not the travel preparation lever 77 is being gripped.

The auger housing attitude adjusting lever 78 is a lever operated to control the swing drive mechanism 46 to change the attitude of the auger housing 44.

Also on the control panel 53, between the left and right operating handles 51L, 51R and located so that they can be operated by hands gripping these left and right operating handles 51L, 51R, left and right turn control switches 81L, 81R are provided.

The left turn control switch 81L consists of a push-button switch and has a push-button 82L facing rearward (toward the operator) from the snow-remover 10. This left turn control switch 81L is an automatically returning contact switch that switches on and produces a switch signal only as long as the push-button 82L is being pressed.

The right turn control switch 81R consists of a push-button switch and has a push-button 82R facing rearward (toward the operator) from the snow-remover 10. This right turn control switch 81R is an automatically returning contact switch that switches on and produces a switch signal only as long as the push-button 82R is being pressed.

Specifically, of the rear face 53a of the control panel 53, the left turn control switch 81L and its push-button 82L are disposed near the left grip 52L in a position on the machine width center CL side thereof. And of the rear face 53a of the control panel 53, the right turn control switch 81R and its push-button 82R are disposed near the right grip 52R and in a position on the machine width center CL side thereof.

When the operator grips the left and right operating handles 51L, 51R with both hands, the thumbs of both hands are on the inner sides (the vehicle width center sides) of the operating handles 51L, 51R.

When while gripping the left and right operating handles 51L, 51R with both hands and steering the snow-remover 10 the operator extends the thumb of the left hand forward and pushes the push-button 82L of the left turn control switch 81L while still gripping the operating handles 51L, 51R, for as long as the push-button 82L is pressed the snow-remover 10 turns to the left. And for as long as the operator extends the thumb of the right hand forward and presses the push-button 82R of the right turn control switch 81R, the snow-remover 10 turns to the right.

In this way, without removing the hands from the left and right operating handles 51L, 51R, it is possible to perform a turning maneuver extremely easily with a small operating force.

Because the left and right turn control switches 81L, 81R, which operate regenerative braking circuits (see reference numerals 38L, 38R of FIG. 4) serving as turning mechanisms, are provided between the left and right operating handles 51L, 51R on the control panel 53 and located so that they can be operated by hands gripping these left and right operating handles 51L, 51R, while gripping the left and right operating handles 51L, 51R with both hands and steering the snow-remover 10 (see FIG. 1) the operator can also operate the left and right turn control switches 81L, 81R with thumbs still gripping the operating handles 51L, 51R. Accordingly, it is not necessary to swap grips of the operating handles 51L, 51R or to remove the hands from the operating handles 51L, 51R each time the snow-remover 10 is left-turned or right-turned. Consequently, the steerability of the snow-remover 10 increases.

Also, an information display 84 and a sounder 85 serving as annunciators are further provided on the rear face 53a of the control panel 53.

The information display 84 is a part for displaying information on the basis of a command signal from the control part 56, and for example consists of a liquid crystal display panel or display lights. The sounder 85 is a part for producing a sound on the basis of a command signal from the control part 56, and for example consists of a buzzer for producing a report sound or a speech generator for producing speech.

FIG. 4 is a control diagram of a snow-remover according to the invention. The engine 34, an electromagnetic clutch 91, the auger 41 and the blower 42 constitute a working part system 92, and the rest constitutes a transporting part system.

First, the operation of the snow-removal working part 40 will be described.

When the key is inserted into the main switch 71 and turned to the start position ST shown in FIG. 3, a cell motor (starter) 93 turns and the engine 34 starts.

The engine throttle lever 76 adjusts the aperture of a throttle valve 94 by way of a throttle wire (not shown), and thereby controls the speed of the engine 34.

Also, the throttle aperture of the throttle valve 94 is automatically controlled by way of a valve driving part 94A in accordance with a control signal from the control part 56. In the throttle valve 94, the aperture control of the valve driving part 94A takes priority over aperture control with the engine throttle lever 76.

Some of the output of the engine 34 rotates the generator 54, and the electrical power obtained is supplied to the battery 55 and the left and right electric motors 33L, 33R. The remainder of the output of the engine 34 drives the auger 41 and the blower 42 via the electromagnetic clutch 91. Electrical power is supplied to the left and right electric motors 33L, 33R and other electrical components from the generator 54 and the battery 55 via a harness 95.

The reference numerals 98L, 98R denote sensors for detecting the speeds (motor speeds; rotational speeds) of the left and right electric motors 33L, 33R. The reference number 99 denotes a sensor for detecting the speed (rotational speed) of the engine 34.

When the travel preparation lever 77 is gripped and the clutch operating switch 73 is operated, the electromagnetic clutch 91 is engaged and the auger 41 and the blower 42 are rotated by motive power from the engine 34. When the travel preparation lever 77 is released, or when the clutch operating switch 73 is pressed again, the electromagnetic clutch 91 disengages.

Next, the operation of the transporting parts 20L, 20R will be explained.

The snow-remover 10 of this invention has left and right electro-magnetic brakes 36L, 36R which are equivalent to a vehicle parking brake. Specifically, the motor shafts of the left and right electric motors 33L, 33R are braked by the left and right electromagnetic brakes 36L, 36R. While the snow-remover 10 is parked, these electromagnetic brakes 36L, 36R are in a braking state under the control of the control part 56. The electromagnetic brakes 36L, 36R are released by the procedure explained below.

When the two conditions of the main switch 71 being in its ON position and the travel preparation lever 77 being gripped are satisfied, if the direction/speed lever 75 is switched to forward or reverse, the electromagnetic brakes 36L, 36R assume a released (non-braking; OFF) state.

Figure 5:
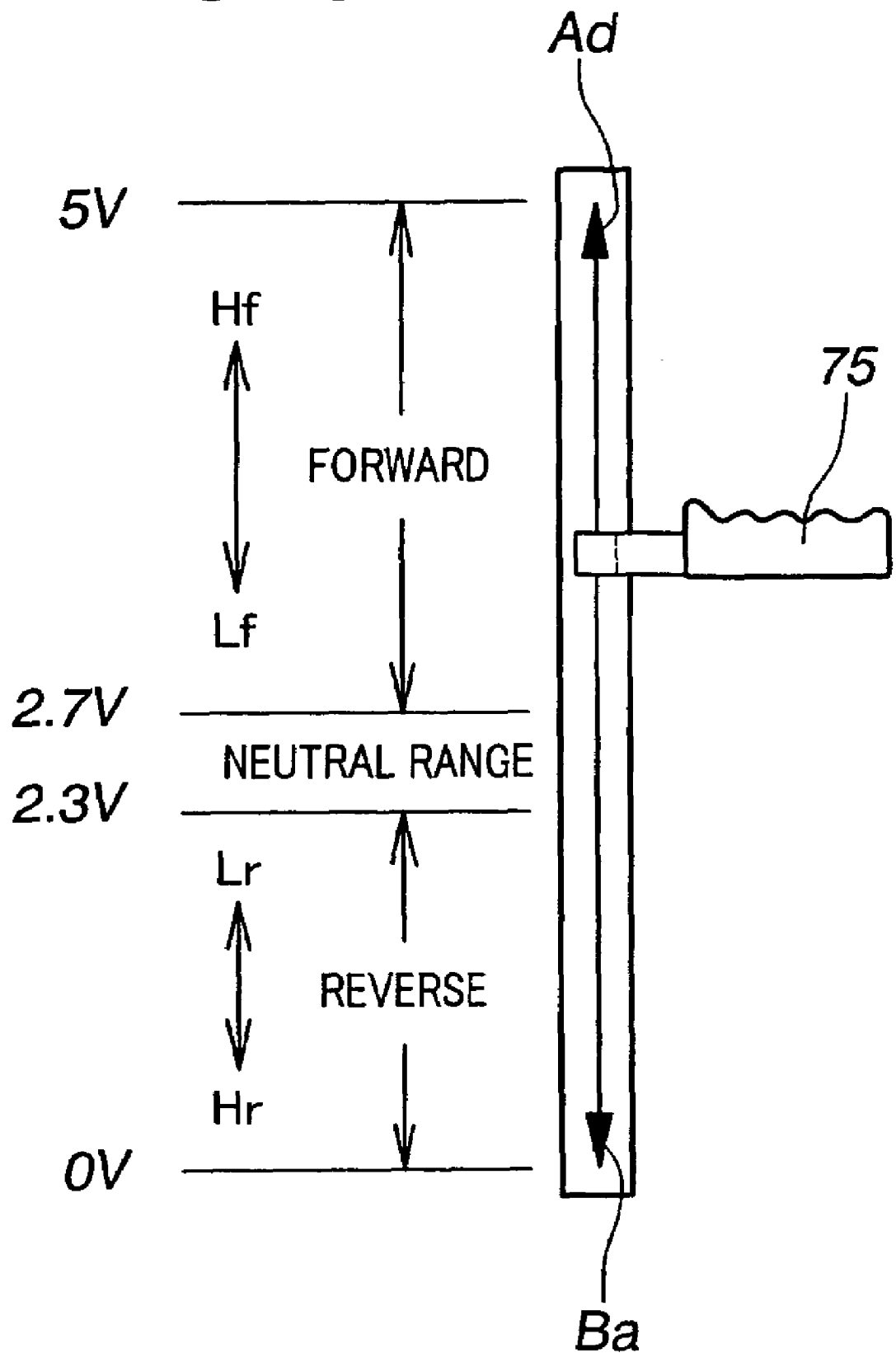
FIG. 5 is a view illustrating Forward, Neutral and Reverse ranges of a direction/speed lever shown in FIG. 3.

As shown in FIG. 5, the direction/speed lever 75 can move back and forth as shown by the arrows Ad, Ba. If it is shifted from a 'Neutral Range' to a 'Forward' side, the vehicle moves forward. In the 'Forward' region, the speed can be varied so that Lf is low speed forward and Hf is high speed forward. Similarly, if it is shifted from the 'Neutral Range' to a 'Reverse' side, the vehicle reverses. In the 'Reverse' region, the speed can be varied so that Lr is low speed reverse and Hr is high speed reverse. In this preferred embodiment, by a potentiometer 75a (see FIG. 4) a voltage corresponding to the position of the direction/speed lever 75 is produced so that the maximum reverse speed is 0V, the maximum forward speed is 5V, and the neutral range is 2.3V to 2.7V, as shown on the left side of FIG. 5. In this way, with the direction/speed lever 75, it is possible to set the forward/reverse direction and perform high/low-speed speed control with a single lever.

As shown in FIG. 4, the control part 56 having obtained information on the position of the direction/speed lever 75 from the potentiometer 75a controls the left and right electric motors 33L, 33R via left and right motor drivers 37L, 37R; the speeds of the electric motors 33L, 33R are detected by rotation sensors 98L, 98R, and on the basis of those signals the control part 56 executes feedback control so that the speeds approach predetermined values. As a result, the left and right driving wheels 21L, 21R travel in a required direction at a predetermined speed.

Braking during travel is carried out by the following procedure. In this preferred embodiment the motor drivers 37L, 37R include regenerative braking circuits 38L, 38R and short-circuit braking circuits 39L, 39R serving as braking means.

When electrical energy is supplied from the battery to an electric motor, the electric motor rotates. On the other hand, a generator is means for converting rotation into electrical energy. In view of this, in this preferred embodiment, by electrical switching the electric motors 33L, 33R are changed into generators, and caused to generate electricity. If the generated voltage is higher than the battery voltage, the electrical energy can be stored in the battery 55. This is the operating principle of regenerative braking.

When the left turn control switch 81L is being pressed, on the basis of its switch ON signal the control part 56 operates the left regenerative braking circuit 38L and thereby lowers the speed of the left drive motor 33L. When the right turn control switch 81R is being pressed, on the basis of its switch ON signal the control part 56 operates the right regenerative braking circuit 38R and thereby lowers the speed of the right electric motor 33R.

That is, only when the left turn control switch 81L is being pressed the snow-remover 10 turns to the left, and only when the right turn control switch 81R is being pressed it turns to the right.

The traveling of the snow-remover 10 can be stopped by any of the following (1) to (3).

(1) Returning the main switch 71 to its OFF position.
(2) Returning the direction/speed lever 75 to its neutral position.
(3) Releasing the travel preparation lever 77.

This stopping of travel is executed using the short-circuit braking circuits 39L and 39R, after electrical speed reduction control, which will be further discussed later, is carried out.

The left short-circuit braking circuit 39L is a circuit for shorting the poles of the left drive motor 33L, and this shorting causes the drive motor 33L to be braked sharply. The right short-circuit braking circuit 39R is the same.

After this stopping of travel, if the main switch 71 is returned to its OFF position, the electromagnetic brakes 36L, 36R work, with the same effect as if a parking brake had been applied.

Next, the operation of control pertaining to a first preferred embodiment of the control part 56 shown in FIG. 4 will be explained, with reference to FIG. 4, on the basis of the flow charts shown in FIG. 6 and FIG. 7. This control flow starts for example when the main switch 71 is turned ON.

First, reference will be made to FIG. 6.

Step (hereinafter abbreviated to ST) 01: Initial setting is carried out.

ST02: Switch signals (including lever position signals) of the main switch 71, the auger switch (work switch) 73, the switching means 77a of the travel preparation lever 77, and the left and right turn control switches 81L, 81R, all shown in FIG. 4, are read in as input signals.

ST03: The control direction and the control level Op of the direction/speed lever 75 are read in. This signal is determined by the position of the direction/speed lever 75. That is, the control level Op of the direction/speed lever 75 is read in from the potentiometer 75a.

ST04: From the control level Op of the direction/speed lever 75, a target travel speed (target rotational speed) Ts of the electric motors 33L, 33R in straight-forward travel is obtained.

ST05: It is checked whether or not the left turn control switch 81L is ON, and if YES then processing proceeds to ST06 and if NO then processing proceeds to ST08.

ST06: Because the snow-remover 10 is to be turned, a correcting map for carrying out deceleration and acceleration control of the electric motors 33L, 33R is selected. A subroutine for actually executing this ST06 will be explained later on the basis of FIG. 7.

ST07: The electric motors 33L, 33R are controlled in a left turn mode. A subroutine for actually executing this ST07 will be explained later on the basis of FIG. 14A and FIG. 14B.

ST08: It is checked whether or not the right turn control switch 81R is ON, and if YES then processing proceeds to ST09 and if NO then processing proceeds to ST11.

ST09: Because the snow-remover 10 is to be turned, a correcting map for carrying out deceleration and acceleration control of the electric motors 33L, 33R is selected. A subroutine for actually executing this ST09 will be explained later on the basis of FIG. 7.

ST10: The electric motors 33L, 33R are controlled in a right turn mode. The control of this ST10 is essentially the same control step as the control of the above-mentioned ST07, except that right turn control is executed instead of left turn control.

ST11: Because the left and right control switches 81L, 81R are both OFF, the electric motors 33L, 33R are controlled in a straight-forward mode. That is, the snow-remover 10 is made to move straight forward.

ST12: It is checked whether or not the main switch 71 is in its 'ON' position, and if YES then it is inferred that this control is to be continued and processing returns to ST02, and if NO then this control is ended.

Figure 6:
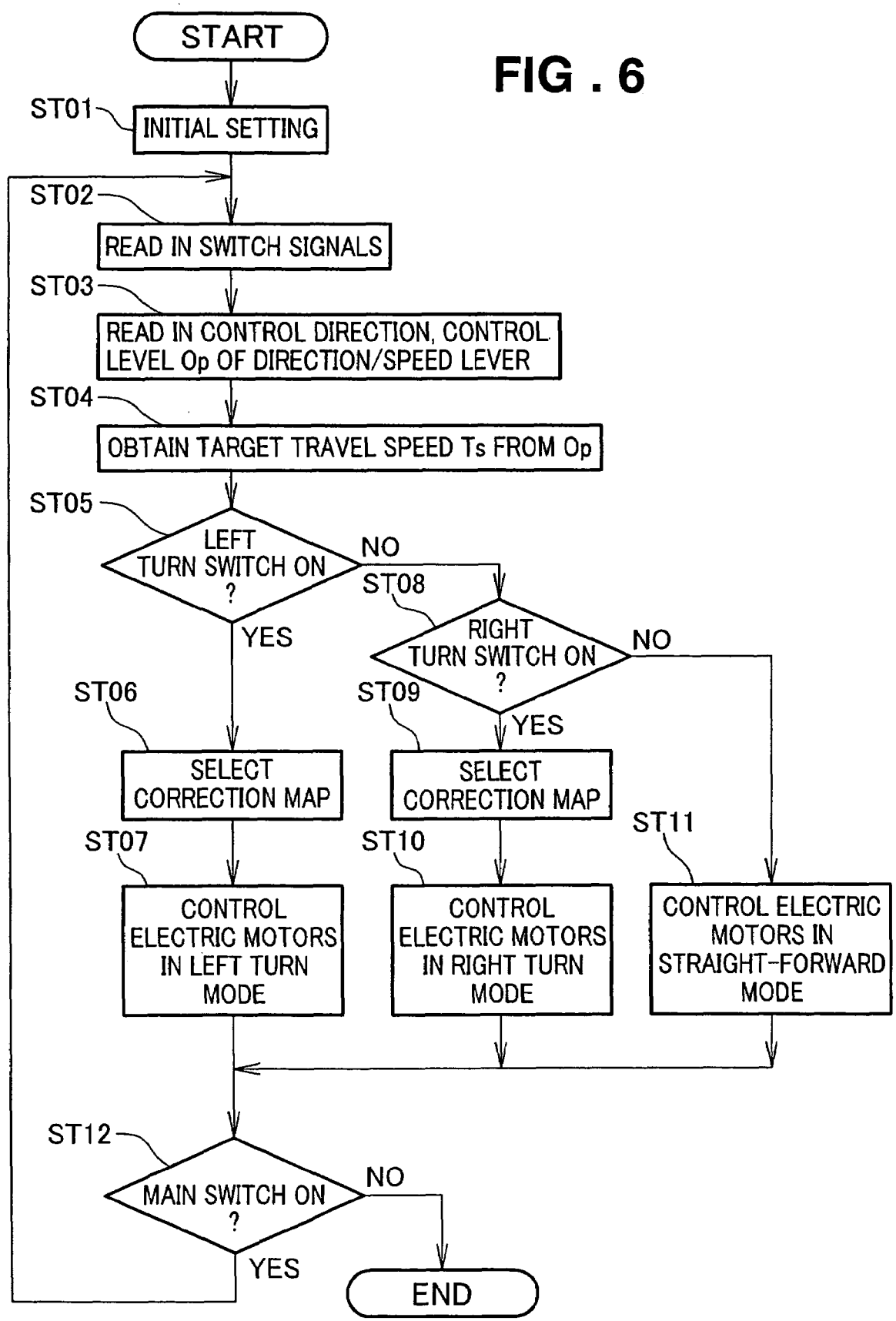
FIG. 6 is a flow chart of a control part pertaining to a first embodiment of the invention.
Figure 7:
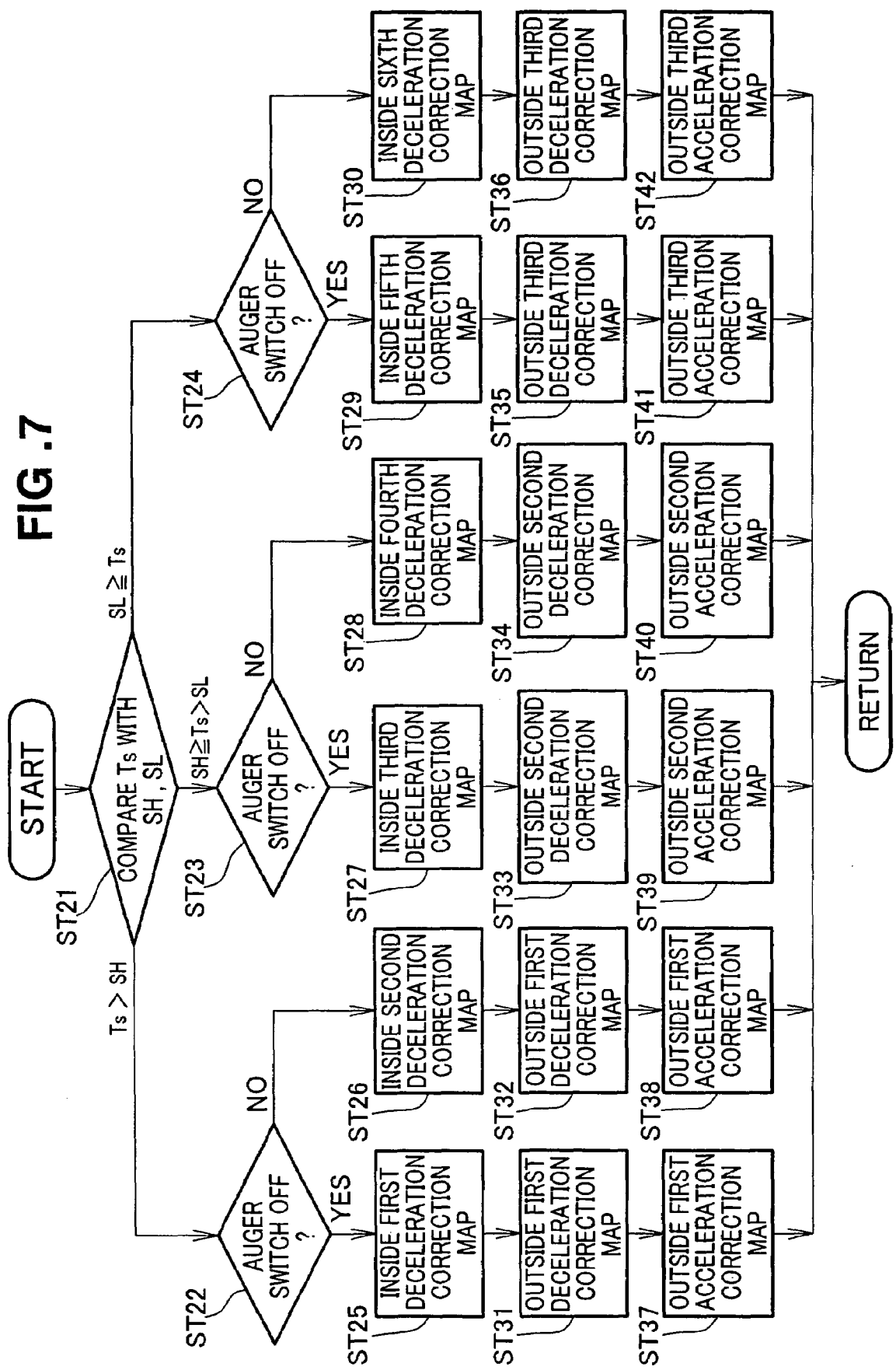
FIG. 7 is a flow chart showing a subroutine of steps ST06 and ST09 shown in FIG. 6.

FIG. 7 shows a subroutine for actually executing the control for selecting a correction map shown in ST06 and ST09 of FIG. 6.

ST21: The target travel speed Ts of the electric motors 33L, 33R is compared with preset speed threshold values (a high-speed threshold value SH and a low-speed threshold value SL). The threshold values are in the relationship 'SH>SL'.

If the target travel speed Ts is greater than the high-speed threshold value SH (Ts>SH), it is inferred that the target travel speed Ts is in a high speed range (high speed travel range) and processing proceeds to ST22. If the target travel speed Ts is in the range between the low-speed threshold value SL and the high-speed threshold value SH (SH≧Ts>SL), it is inferred that the target travel speed Ts is in a medium speed range (medium speed travel range) and processing proceeds to ST23. If the target travel speed Ts is below the low-speed threshold value SL, i.e. in the range between 0 and the low-speed threshold value SL (0<Ts≦SL), it is inferred that the target travel speed Ts is in a low speed range low speed travel range) and processing proceeds to ST24.

ST22: It is checked whether or not the auger switch (work switch) 73 is OFF. If YES then it is inferred that the snow-removal working part 40 is in its 'Not At Work', OFF state and processing proceeds to ST25. If NO then it is inferred that the snow-removal working part 40 is in its 'At Work', ON state and processing proceeds to ST26.

ST23: As in ST22, it is checked whether or not the auger switch 73 is OFF. If YES then processing proceeds to ST27, and if NO then processing proceeds to ST28.

ST24: As in ST22, it is checked whether or not the auger switch 73 is OFF. If YES then processing proceeds to ST29, and if NO then processing proceeds to ST30.

ST25 to ST30 select one pattern from a number of preset deceleration patterns for the motor on the inside of the turn having different deceleration correction coefficient characteristics.

Figure 8:
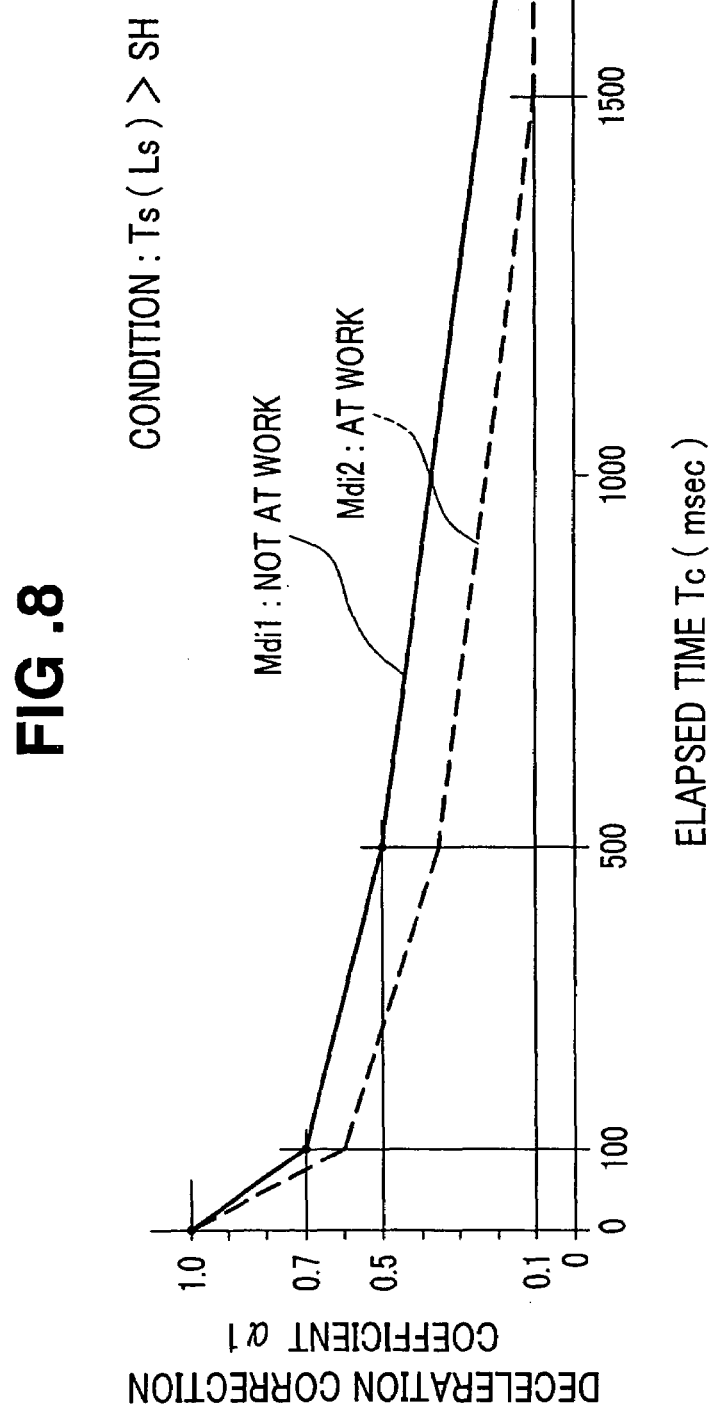
FIG. 8 is a chart showing deceleration correction coefficient maps for a motor on the inside of a turn, respectively for when the electric vehicle is Not At Work and when the vehicle is At Work, for use when the electric vehicle is traveling at a high speed.

ST25: A first pattern is selected. Specifically, a first deceleration correction coefficient map Mdi1 for the motor on the inside of the turn shown in FIG. 8 is selected.

ST26: A second pattern is selected. Specifically, a second deceleration correction coefficient map Mdi2 for the motor on the inside of the turn shown in FIG. 8 is selected.

Figure 9:
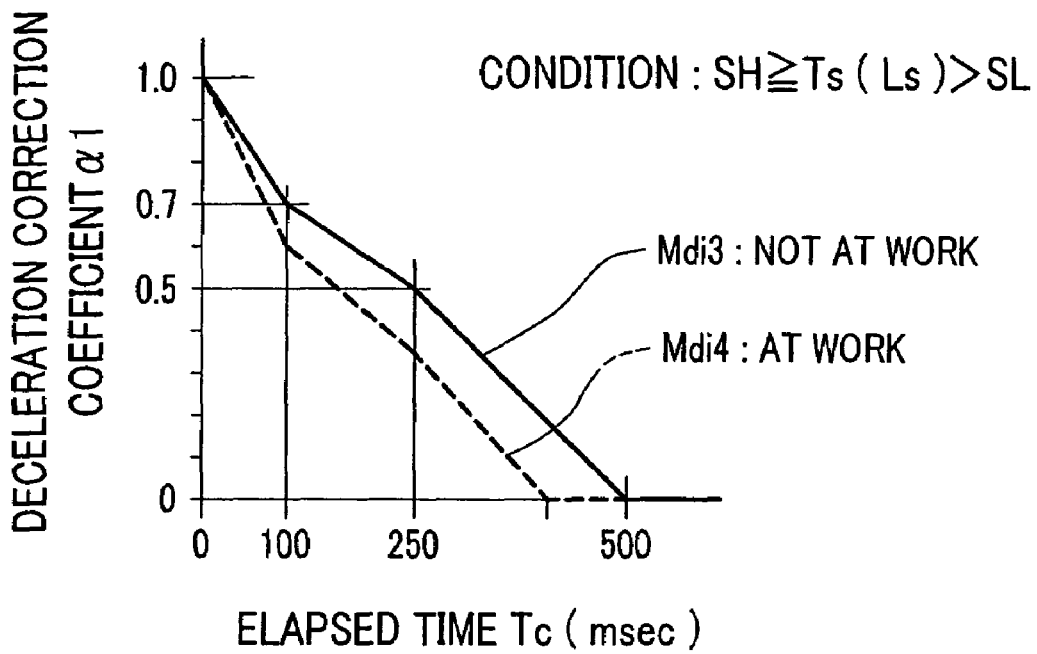
FIG. 9 is a chart showing deceleration correction coefficient maps for a motor on the inside of a turn, respectively for when the electric vehicle is Not At Work and when the vehicle is At Work, for use when the vehicle is traveling at a medium speed.

ST27: A third pattern is selected. Specifically, a third deceleration correction coefficient map Mdi3 for the motor on the inside of the turn shown in FIG. 9 is selected.

ST28: A fourth pattern is selected. Specifically, a fourth deceleration correction coefficient map Mdi4 for the motor on the inside of the turn shown in FIG. 9 is selected.

Figure 10:
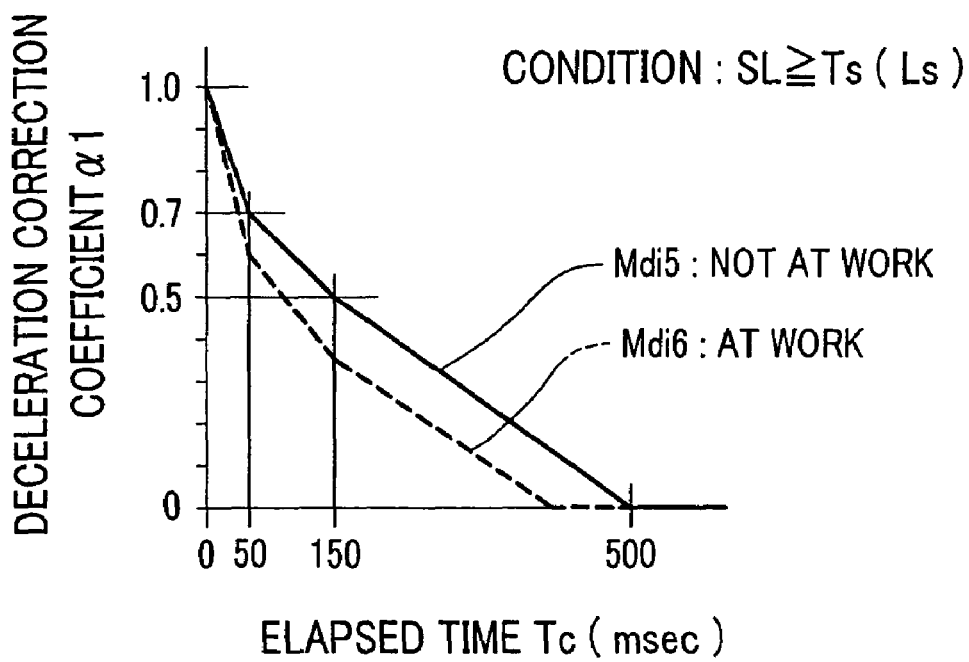
FIG. 10 is a chart showing deceleration correction coefficient maps for a motor on the inside of a turn, respectively for when the electric vehicle is Not At Work and when the vehicle is At Work, for use when the vehicle is traveling at a low speed.

ST29: A fifth pattern is selected. Specifically, a fifth deceleration correction coefficient map Mdi5 for the motor on the inside of the turn shown in FIG. 10 is selected.

ST30: A sixth pattern is selected. Specifically, a sixth deceleration correction coefficient map Mdi6 for the motor on the inside of the turn shown in FIG. 10 is selected.

ST31 to ST36 select one pattern from a number of preset deceleration patterns for the motor on the outside of the turn having different deceleration correction coefficient characteristics.

Figure 12:
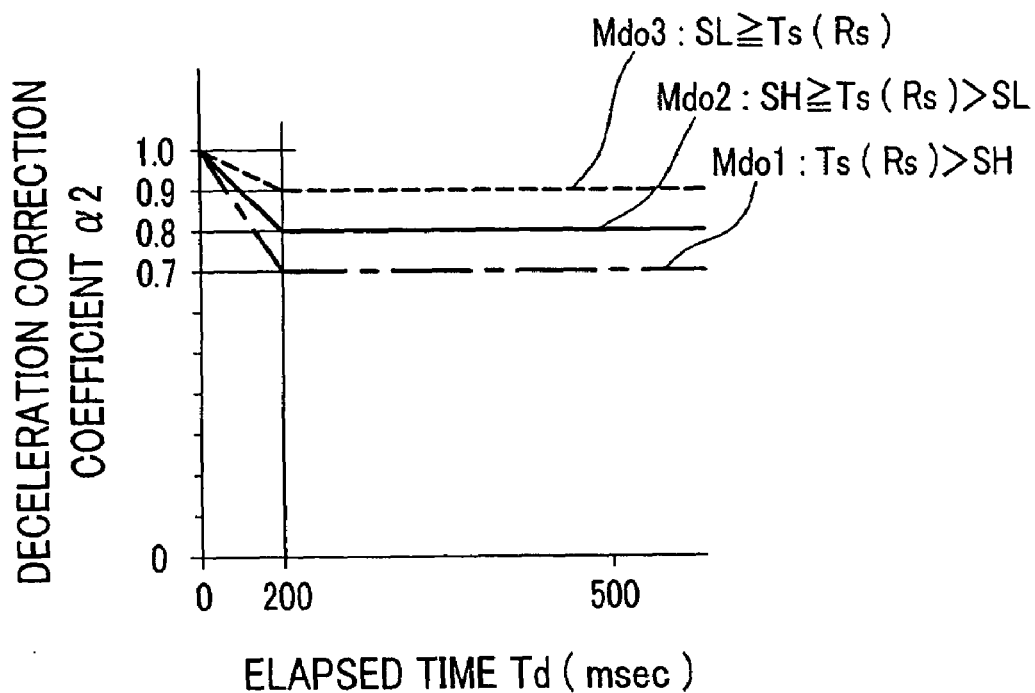
FIG. 12 is a chart showing deceleration correction coefficient maps for use in control when decelerating a motor on the outside of a turn.

ST31: A first pattern is selected. Specifically, a first deceleration correction coefficient map Mdo1 for the motor on the outside of the turn shown in FIG. 12 is selected.

ST32: A first pattern is selected. Specifically, the first deceleration correction coefficient map Mdo1 for the motor on the outside of the turn shown in FIG. 12 is selected.

ST33: A second pattern is selected. Specifically, a second deceleration correction coefficient map Mdo2 for the motor on the outside of the turn shown in FIG. 12 is selected.

ST34: A second pattern is selected. Specifically, the second deceleration correction coefficient map Mdo2 for the motor on the outside of the turn shown in FIG. 12 is selected.

ST35: A third pattern is selected. Specifically, a third deceleration correction coefficient map Mdo3 for the motor on the outside of the turn shown in FIG. 12 is selected.

ST36: A third pattern is selected. Specifically, the third deceleration correction coefficient map Mdo3 for the motor on the outside of the turn shown in FIG. 12 is selected.

ST37 to ST42 select one pattern from a number of preset acceleration patterns for the motor on the outside of the turn having different acceleration correction coefficient characteristics and then return processing to ST06 or ST09 of FIG. 6.

Figure 13:
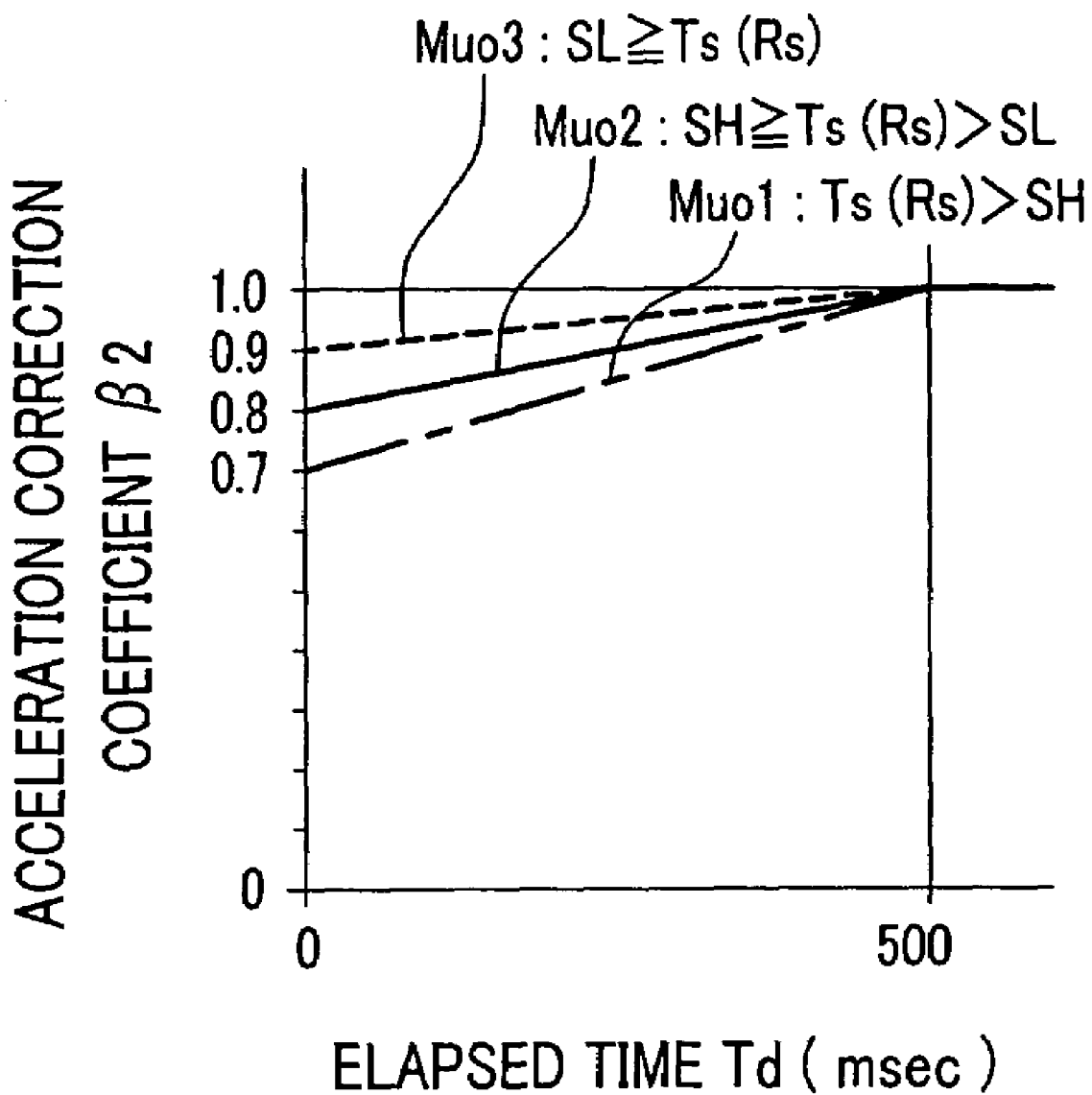
FIG. 13 is a chart showing acceleration correction coefficient maps for use in control when accelerating a motor on the outside of a turn.

ST37: A first pattern is selected. Specifically, a first acceleration correction coefficient map Muo1 for the motor on the outside of the turn shown in FIG. 13 is selected.

ST38: A first pattern is selected. Specifically, the first acceleration correction coefficient map Muo1 for the motor on the outside of the turn shown in FIG. 13 is selected.

ST39: A second pattern is selected. Specifically, a second acceleration correction coefficient map Muo2 for the motor on the outside of the turn shown in FIG. 13 is selected.

ST40: A second pattern is selected. Specifically, the second acceleration correction coefficient map Muo2 for the motor on the outside of the turn shown in FIG. 13 is selected.

ST41: A third pattern is selected. Specifically, a third acceleration correction coefficient map Muo3 for the motor on the outside of the turn shown in FIG. 13 is selected.

ST42: A third pattern is selected. Specifically, the third acceleration correction coefficient map Muo3 for the motor on the outside of the turn shown in FIG. 13 is selected.

Here, the various correction maps will be explained on the basis of FIG. 8 to FIG. 13. These correction maps have elapsed time as a variable and are for obtaining a deceleration correction coefficient or an acceleration correction coefficient corresponding to this elapsed time. In each map, 'Not At Work' means that the auger switch 73 is OFF; that is, the snow-removal working part 40 is in its OFF state. And 'At Work' means that the auger switch 73 is ON; that is, the snow-removal working part 40 is in its ON state.

FIG. 8 is a view illustrating the first and second deceleration correction coefficient maps for the motor on the inside of the turn. With elapsed time Tc (msec) on the horizontal axis and deceleration correction coefficient $\alpha 1$ on the vertical axis, it shows first and second deceleration correction coefficient maps Mdi1, Mdi2 for obtaining a deceleration correction coefficient $\alpha 1$ corresponding to the elapsed time Tc for the motor 33L on the inside of the turn.

These first and second deceleration correction coefficient maps Mdi1, Mdi2 are maps selected when in ST21 of FIG. 7 the condition 'Ts>SH' is satisfied. The deceleration correction coefficient $\alpha 1$ has a maximum value of 1.0 when the elapsed time Tc is 0 and approaches 0 as the time Tc elapses.

The solid line is the first deceleration correction coefficient map Mdi1 and ows a characteristic curve of the deceleration correction coefficient $\alpha 1$ for when the vehicle is Not At Work. In the first deceleration correction coefficient map Mdi1 the upper limit value 1.0 of the deceleration correction coefficient $\alpha 1$ corresponds to when the elapsed time Tc is 0 (msec), and a lower limit value 0.1 of the deceleration correction coefficient $\alpha 1$ corresponds to when the elapsed time Tc is 2000 (msec).

The dashed line is the second deceleration correction coefficient map Mdi2 and shows a characteristic curve of the deceleration correction coefficient $\alpha 1$ for when the vehicle is At Work. In the second deceleration correction coefficient map Mdi2 an upper limit value 1.0 of the deceleration correction coefficient $\alpha 1$ corresponds to when the elapsed time Tc is 0 (msec) and a lower limit value 0.1 of the deceleration correction coefficient $\alpha 1$ corresponds to when the elapsed time Tc is 1500 (msec).

In the snow-remover 10, the resistance to travel encountered by the transporting parts 20L, 20R changes with switching ON/OFF of the snow-removal working part 40 auger.

That is, because when the vehicle is Not At Work the snow-remover 10 just moves, it can travel without suffering the influence of a load (working load) acting on the snow-removal working part 40, and furthermore it often travels in places where the road surface resistance is relatively small. When the vehicle is At Work, on the other hand, the snow-remover 10 often suffers influences of working load size and influences of bias of the working load to the left or right. Moreover, because it is at work, the snow-remover 10 is usually in a place where there are large fluctuations in road surface resistance.

Consequently, depending on whether the snow-remover 10 is At Work or Not At Work, differences arise in the behavior of the snow-remover 10 when it turns. In particular, when the snow-remover 10 is small and light, it is susceptible to influences of working load and road resistance and influences of moment during turning. Accordingly, when the snow-remover 10 at work is turned, a delay can arise in the turning.

With respect to this, in this invention, the second deceleration correction coefficient map Mdi2 selected when the vehicle is At Work is set to a characteristic such that the deceleration correction coefficient $\alpha 1$ becomes small in a shorter time than in the first deceleration correction coefficient map Mdi1 selected when the vehicle is Not At Work. That is, the degree of deceleration is made larger so that the motor 33L on the inside of the turn slows down more quickly.

FIG. 9 is a view illustrating third and fourth deceleration correction coefficient maps for the motor on the inside of the turn. With elapsed time Tc (msec) on the horizontal axis and deceleration correction coefficient $\alpha 1$ on the vertical axis, it shows third and fourth deceleration correction coefficient maps Mdi3, Mdi4 for obtaining a deceleration correction coefficient $\alpha 1$ corresponding to the elapsed time Tc for the motor 33L on the inside of the turn.

These third and fourth deceleration correction coefficient maps Mdi3, Mdi4 are maps selected when in ST21 of FIG. 7 the condition 'SH≧Ts>SL' is satisfied. The deceleration correction coefficient $\alpha 1$ has a maximum value of 1.0 when the elapsed time Tc is 0 and approaches 0 as the time Tc elapses.

The solid line is the third deceleration correction coefficient map Mdi3 and shows a characteristic curve of the deceleration correction coefficient $\alpha 1$ when the vehicle is Not At Work. In the third deceleration correction coefficient map Mdi3 an upper limit value 1.0 of the deceleration correction coefficient α1 corresponds to when the elapsed time Tc is 0 (msec) and a lower limit value 0.0 of the deceleration correction coefficient α1 corresponds to when the elapsed time Tc is 500 (msec).

The dashed line is the fourth deceleration correction coefficient map Mdi4 and shows a characteristic curve of the deceleration correction coefficient α1 when the vehicle is At Work. In the fourth deceleration correction coefficient map Mdi4 an upper limit value 1.0 of the deceleration correction coefficient α1 corresponds to when the elapsed time Tc is 0 (msec) and a lower limit value 0.0 of the deceleration correction coefficient α1 corresponds to when the elapsed time Tc is 400 (msec).

That is, as in the relationship of the first and second deceleration correction coefficient maps Mdi1, Mdi2 of FIG. 8, the fourth deceleration correction coefficient map Mdi4 selected when the vehicle is At Work is set to a characteristic such that the deceleration correction coefficient α1 becomes small in a shorter time than in the third deceleration correction coefficient map Mdi3 selected when the vehicle is Not At Work.

FIG. 10 is a view illustrating fifth and sixth deceleration correction coefficient maps for the motor on the inside of the turn. With elapsed time Tc (msec) on the horizontal axis and deceleration correction coefficient α1 on the vertical axis, it shows fifth and sixth deceleration correction coefficient maps Mdi5, Mdi6 for obtaining a deceleration correction coefficient α1 corresponding to the elapsed time Tc for the motor 33L on the inside of the turn.

These fifth and sixth deceleration correction coefficient maps Mdi5, Mdi6 are maps selected when in ST21 of FIG. 7 the condition 'SL≧Ts' is satisfied. The deceleration correction coefficient α1 has a maximum value of 1.0 when the elapsed time Tc is 0 and approaches 0 as the time Tc elapses.

The solid line is the fifth deceleration correction coefficient map Mdi5 and shows a characteristic curve of the deceleration correction coefficient α1 when the vehicle is Not At Work. In the fifth deceleration correction coefficient map Mdi5 an upper limit value 1.0 of the deceleration correction coefficient α1 corresponds to when the elapsed time Tc is 0 (msec) and a lower limit value 0.0 of the deceleration correction coefficient α1 corresponds to when the elapsed time Tc is 500 (msec).

The dashed line is the sixth deceleration correction coefficient map Mdi6 and shows a characteristic curve of the deceleration correction coefficient α1 when the vehicle is At Work. In the sixth deceleration correction coefficient map Mdi6 an upper limit value 1.0 of the deceleration correction coefficient α1 corresponds to when the elapsed time Tc is 0 (msec) and a lower limit value 0.0 of the deceleration correction coefficient α1 corresponds to when the elapsed time Tc is 400 (msec).

That is, as in the relationship of the first and second deceleration correction coefficient maps Mdi1, Mdi2 of FIG. 8, the sixth deceleration correction coefficient map Mdi6 selected when the vehicle is At Work is set to a characteristic such that the deceleration correction coefficient α1 becomes small in a shorter time than in the fifth deceleration correction coefficient map Mdi5 selected when the vehicle is Not At Work.

In the fifth and sixth deceleration correction coefficient maps Mdi5, Mdi6, the characteristic curves of the deceleration correction coefficient α1 are more downwardly convex than in the third and fourth deceleration correction coefficient maps Mdi3, Mdi4. That is, they are set so that the deceleration correction coefficient α1 decreases more steeply to start with.

Figure 11:
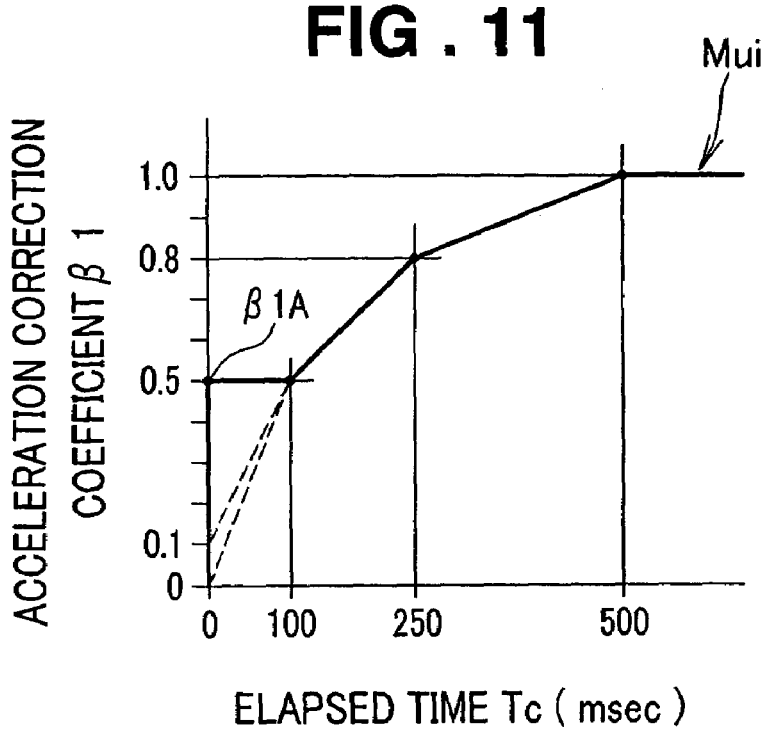
FIG. 11 is a chart showing an acceleration correction coefficient map for use in control when accelerating a motor on the inside of a turn.

FIG. 11 is a view illustrating an acceleration correction coefficient map for the motor on the inside of the turn. With elapsed time Tc (msec) on the horizontal axis and acceleration correction coefficient β1 on the vertical axis, it shows an acceleration correction coefficient map Mui for obtaining an acceleration correction coefficient β1 corresponding to the elapsed time Tc for the motor on the inside of the turn.

This acceleration correction coefficient map Mui is a map used when accelerating the motor 33L on the inside of the turn in an acceleration control step (ST113 of FIG. 14B) which will be further discussed later. The acceleration correction coefficient β1 is near to 0 when the elapsed time Tc is 0 and approaches 1 as the time Tc elapses. Specifically, the acceleration correction coefficient β1 has an upper limit value set to 1.0 and has a lower limit value set to 0.0 to 0.1.

Generally, when the snow-remover 10 is returned from turning travel to straight-line travel, the acceleration correction coefficient β1 is gradually increased as shown by the dashed line in FIG. 11. That is, the motor 33L on the inside of the turn is gradually accelerated from a minimum speed.

However, with gradual acceleration like this, at times such as when the influence of the inertias of the left and right transporting parts 20L, 20R and/or the speed difference between the left and right transporting parts 20L, 20R is large, it is difficult to return to a straight-line travel state rapidly. In particular, when the left and right transporting parts 20L, 20R are crawlers, they have the strength of ground contact and size of driving force peculiar to crawlers. Because of this, when the snow-remover 10 is operated to shift from turning travel to straight-line travel, it cannot do so rapidly.

To solve this, in the present invention, the acceleration correction coefficient β1 shown with a solid line is adopted. That is, it is a feature of the invention that the acceleration correction coefficient β1 shown with a solid line is set so that when the left turn control switch 81L is turned OFF (to shift to straight-line travel), i.e. when the elapsed time Tc is 0, it assumes an initial correction value β1A of about 0.5, greatly larger than its minimum value of 0.0.

The acceleration correction coefficient β1 of when the elapsed time Tc is 0 is a value β1A obtained by adding a fixed value to the minimum value 0 (zero) or approximately 0. For example, if the minimum value is 0, the fixed value is 0.5, and if the minimum value is 0.1 the fixed value is 0.4. Thus, the value β1A obtained by adding a fixed value to the minimum value is 0.5.

Thereafter, the acceleration correction coefficient 11 increases as the time Tc elapses.

FIG. 12 illustrates deceleration correction coefficient maps for the motor on the outside of the turn, and with elapsed time Td (msec) on the horizontal axis and a deceleration correction coefficient α2 of the right electric motor (the motor on the outside of the turn) on the vertical axis shows first, second and third deceleration correction coefficient maps Mdo1, Mdo2 and Mdo3 for the right electric motor 33R for obtaining a deceleration correction coefficient α2 corresponding to the elapsed time Td. For the right electric motor 33R, there is no selection of maps according to whether the vehicle is At Work or Not At Work.

In these first, second and third deceleration correction coefficient maps Mdo1, Mdo2 and Mdo3, the deceleration correction coefficient α2 has a maximum of 1.0 when the elapsed time Td is 0 and approaches 0 as the time Td elapses.

More specifically, the first deceleration correction coefficient map Mdo1, shown with a broken line, is a map selected when in ST21 of FIG. 7 the condition 'Ts>SH' is satisfied. This first deceleration correction coefficient map Mdo1 has the characteristic that as the elapsed time Td elapses from 0 to 200 (msec) the deceleration correction coefficient α2 is decreased from its upper limit value of 1.0 to a lower limit value of 0.7, and after that it remains at the lower limit value. Thus, at high travel speeds, the degree of deceleration of the motor on the outside of the turn 33R is made large.

The second deceleration correction coefficient map Mdo2, shown with a solid line, is a map selected when in ST21 of FIG. 7 the condition 'SH≧Ts>SL' is satisfied. This second deceleration correction coefficient map Mdo2 has the characteristic that as the elapsed time Td elapses from 0 to 200 (msec) the deceleration correction coefficient α2 is decreased from its upper limit value of 1.0 to a lower limit value of 0.8, and after that it remains at the lower limit value. Thus, at medium travel speeds, the degree of deceleration of the right electric motor (the motor on the outside of the turn) 33R is made medium.

The third deceleration correction coefficient map Mdo3, shown with a dashed line, is a map selected when in ST21 of FIG. 7 the condition 'SL≧Ts' is satisfied. This third deceleration correction coefficient map Mdo3 has the characteristic that as the elapsed time Td elapses from 0 to 200 (msec) the deceleration correction coefficient α2 is decreased from its upper limit value of 1.0 to a lower limit value of 0.9, and after that it remains at the lower limit value. Thus, at low travel speeds, the degree of deceleration of the right electric motor (the motor on the outside of the turn) 33R is made small.

FIG. 13 is a view illustrating acceleration correction coefficient maps for the motor on the outside of the turn, and with elapsed time Td (msec) on the horizontal axis and an acceleration correction coefficient β2 for the right electric motor (the motor on the outside of the turn) 33R on the vertical axis shows first, second and third acceleration correction coefficient maps Muo1, Muo2 and Muo3 for the right electric motor 33R for obtaining an acceleration correction coefficient β2 corresponding to the elapsed time Td. For the right electric motor 33R, there is no selection of maps according to whether the vehicle is At Work or Not At Work.

In these first, second and third acceleration correction coefficient maps Muo1, Muo2 and Muo3, the acceleration correction coefficient β2 is less than 1 when the elapsed time Td is 0 and approaches 1 as the time Td elapses.

More specifically, the first acceleration correction coefficient map Muo1, shown with a broken line, is a map selected when in ST21 of FIG. 7 the condition 'Ts>SH' is satisfied. This first acceleration correction coefficient map Muo1 has the characteristic that as the elapsed time Td elapses from 0 to 500 (msec) the acceleration correction coefficient β2 is increased from a lower limit value of 0.7 to an upper limit value of 1.0, and after that it remains at the upper limit value. Thus, at high travel speeds, the degree of acceleration of the right electric motor 33R, i.e. the gradient of the acceleration correction coefficient β2 with respect to the elapsed time, is made large.

The second acceleration correction coefficient map Muo2, shown with a solid line, is a map selected when in ST21 of FIG. 7 the condition 'SH≧Ts>SL' is satisfied. This second acceleration correction coefficient map Muo2 has the characteristic that as the elapsed time Td elapses from 0 to 500 (msec) the acceleration correction coefficient β2 is increased from a lower limit value of 0.8 to an upper limit value of 1.0, and after that it remains at the upper limit value. Thus, at medium travel speeds, the degree of acceleration of the right electric motor 33R is made medium.

The third acceleration correction coefficient map Muo3, shown with a dashed line, is a map selected when in ST21 of FIG. 7 the condition 'SL≧Ts' is satisfied. This third acceleration correction coefficient map Muo3 has the characteristic that as the elapsed time Td elapses from 0 to 500 (msec) the acceleration correction coefficient β2 is increased from a lower limit value of 0.9 to an upper limit value of 1.0, and after that it remains at the upper limit value. Thus, at low travel speeds, the degree of acceleration of the right electric motor 33R, that is, the gradient of the acceleration correction coefficient β2 with respect to the elapsed time Td, is made small.

Next, a subroutine for actually executing the left turn mode control of when the vehicle is Not At Work (i.e. when the snow-removal working part 40 is OFF) shown in step ST07 of FIG. 6 will be explained, on the basis of FIG. 14A and FIG. 14B. The control of the right electric motor (the motor on the outside of the turn) 33R will be explained on the basis of FIG. 15A and FIG. 15B.

The subroutine for the control pertaining to the inside of the turn and the subroutine for the control pertaining to the outside of the turn are essentially both executed simultaneously, by parallel processing or time-allocated processing. The count times Tc, Td are the elapsed times Tc, Td.

First, the subroutine for executing the control pertaining to the inside of the turn will be described, on the basis of FIG. 14A.

ST101: A first timer built into the control part 56 is reset (to counter time Tc=0) and then started.

ST102: Because the left turn control switch 81L in ST05 of FIG. 6 is ON, the actual speed Ls of the left electric motor (the motor on the inside of the turn) 33L is measured. The actual speed Ls can be measured for example by measuring the present speed of the left electric motor 33L with the rotation sensor 98L shown in FIG. 4.

ST103: From the selected inside motor deceleration pattern, that is, the pattern selected from the inside motor deceleration correction coefficient maps Mdi1 to Mdi6 shown in FIG. 8 to FIG. 10, a deceleration correction coefficient α1 is obtained from the count time Tc. All that is necessary is that a deceleration correction coefficient α1 corresponding to variation in the count time Tc be obtained.

ST104: The actual speed Ls of the left electric motor (the motor on the inside of the turn) 33L is multiplied by the deceleration correction coefficient α1 obtained in ST103 to obtain a deceleration target speed Lt of the left electric motor 33L.

ST105: Deceleration control of the left electric motor 33L is executed with a deceleration control signal Qdi based on the deceleration target speed Lt.

ST 106: The switch signal of the left turn control switch 81L is read in as an input signal.

ST107: It is checked whether or not the left turn control switch 81L is ON. If YES then it is inferred that the turning manoeuver is being continued and processing returns to ST102. If NO then it is inferred that the turning manoeuver has ended, that is, it is inferred that a control-release signal of when the control was released has been received from the left turn control switch 81L, and processing proceeds to ST 108 of FIG. 14B.

Figure 14A:
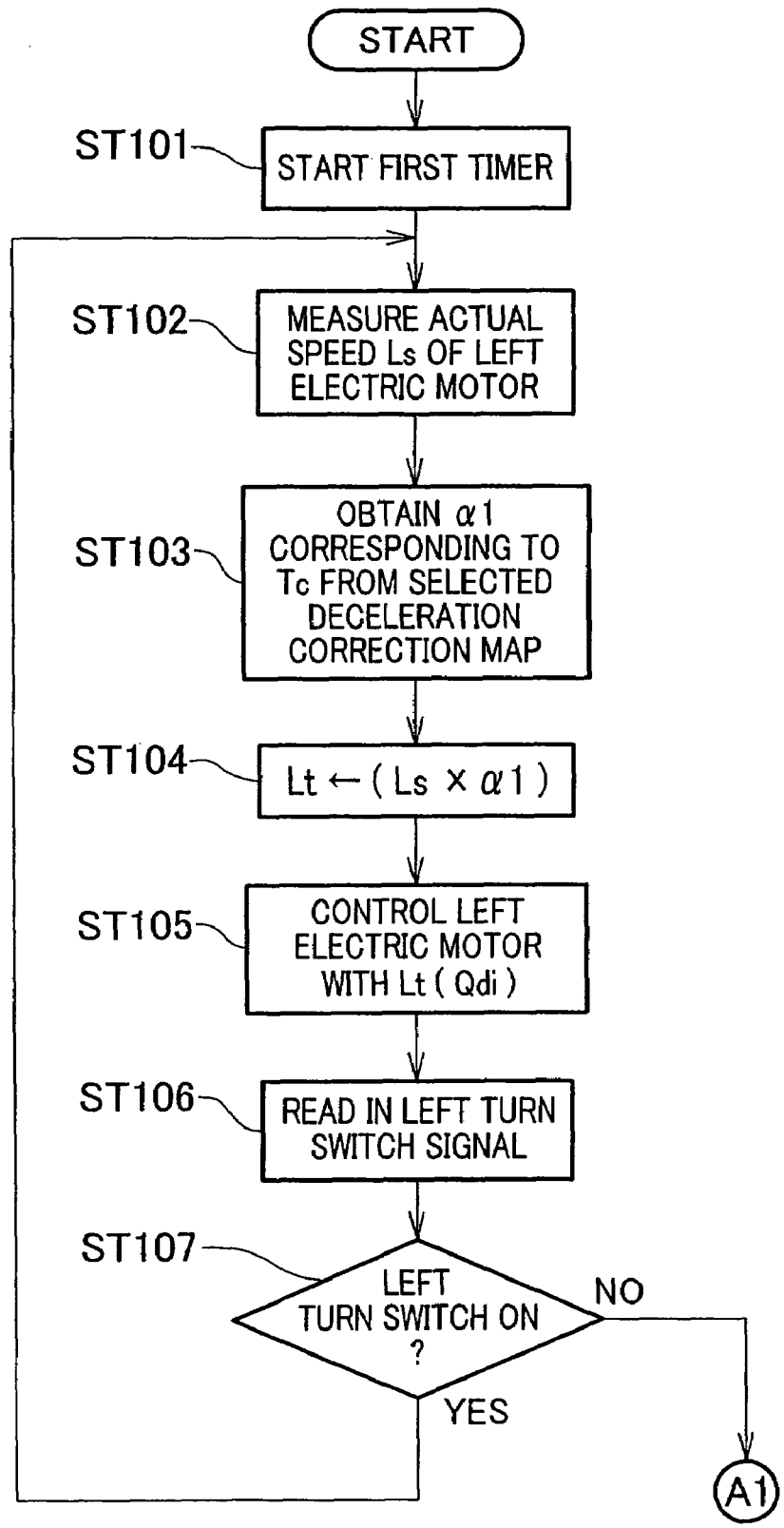
FIG. 14A and FIG. 14B are flow charts showing a subroutine for actually executing left turn mode control when the vehicle is Not At Work shown in ST07 of FIG. 6.
Figure 14B:
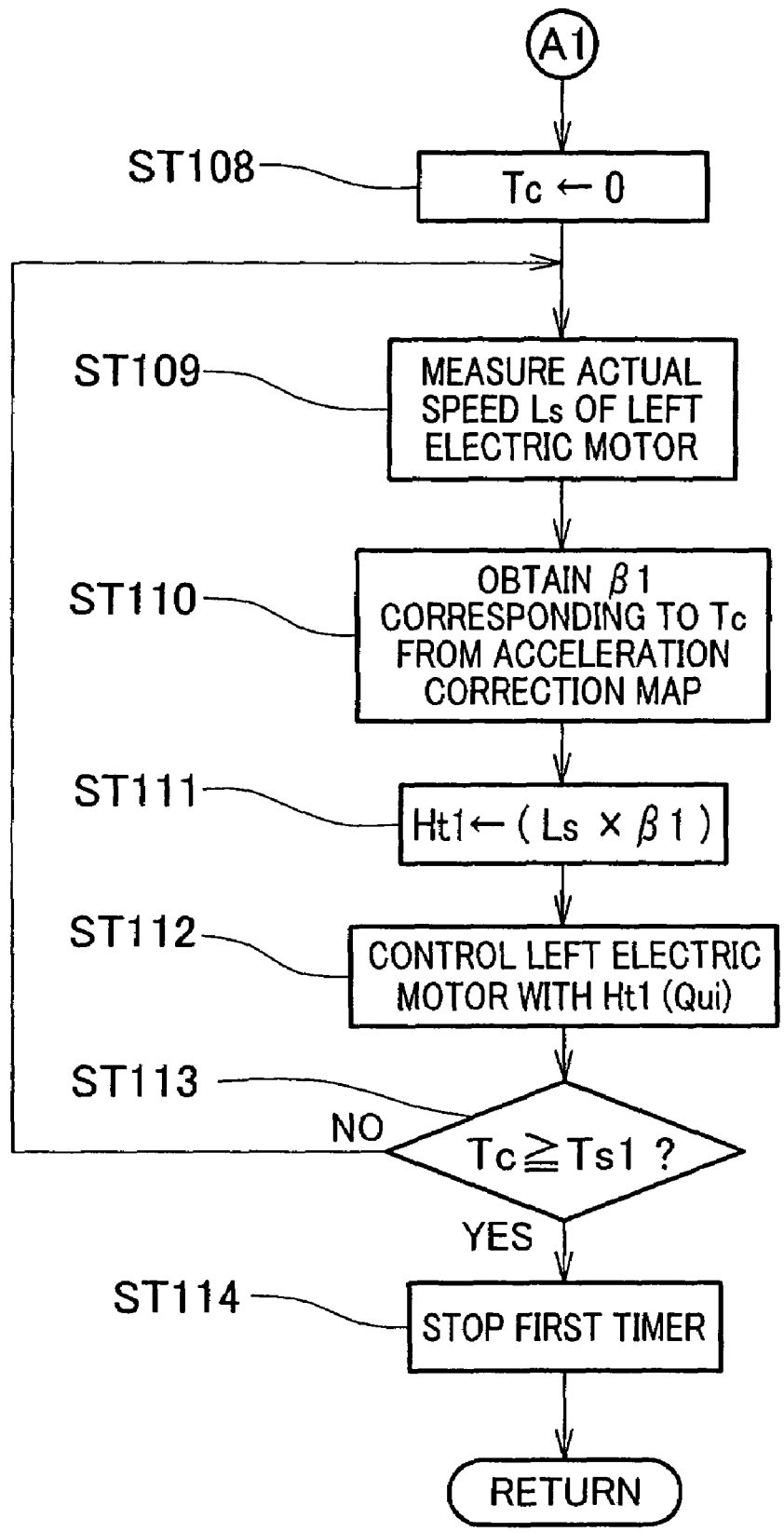

FIG. 14B, ST108: The count time Tc of the first timer is reset to 0. The first timer continues counting.

ST109: The actual speed Ls of the left electric motor (the motor on the inside of the turn) 33L is measured.

ST110: From the preset inside motor acceleration pattern, that is, from the acceleration correction coefficient map Mui for the inside motor shown in FIG. 11, an acceleration correction coefficient β1 is obtained from the count time Tc. All that is necessary is that an acceleration correction coefficient β1 corresponding to variation in the count time Tc be obtained.

ST111: The actual speed Ls of the left electric motor 33L is multiplied by the acceleration correction coefficient β1 to obtain an acceleration target speed Ht1 of the left electric motor 33L.

ST112: Acceleration control of the left electric motor 33L is carried out with an acceleration control signal Qui based on the acceleration target speed Ht1. That is, the actual speed Ls is increased by the acceleration target speed Ht1.

Here, ST11 and ST112 will be explained in detail. The acceleration control signal Qui is a value corresponding to the acceleration target speed Ht1. The acceleration target speed Ht1 is a value corresponding to the acceleration correction coefficient β1. Therefore, the acceleration control signal Qui of the left electric motor 33L is a value corresponding to the acceleration correction coefficient β1. If the acceleration correction coefficient β1 increases greatly, the acceleration control signal Qui also increases greatly.

The acceleration correction coefficient β1 at the point in time when the left turn control switch 81L is turned OFF and a control-release signal is received from the left turn control switch 81L (ST107 in FIG. 14A), that is, when the elapsed time Tc is 0 as shown in FIG. 11, is the value β1 A obtained by adding a fixed value to the minimum value 0 or approximately 0.

The minimum value Quim (not shown) of the acceleration control signal Qui is a value corresponding to the minimum value 0 or approximately 0 of the acceleration correction coefficient β1. A fixed value Quic (not shown) of the acceleration control signal is a value corresponding to the fixed value added to the minimum value of the acceleration correction coefficient β1. Therefore, the acceleration control signal Qui of the left electric motor 33L is the value obtained by adding the fixed value Quic to the minimum value Quim (Qui=Quim+Quic), and corresponds to β1 A.

The acceleration correction coefficient β1 of the left electric motor 33L at the point in time at which the left turn control switch 81L is turned OFF (the time at which the elapsed time Tc is 0), that is, the acceleration control signal Qui, is extremely large. By the acceleration control signal Qui being made large and the left electric motor 33L thereby being accelerated at a stroke, the speed difference between the left and right electric motors 33L, 33R is eliminated rapidly.

ST113: It is checked whether or not the count time of the first timer (elapsed time) Tc has reached a preset fixed first reference time Ts1. If YES then it is inferred that acceleration control of the left electric motor 33L of when the switch to straight-line travel was made has ended, and processing proceeds to ST114. If NO then processing returns to ST109.

ST114: The first timer is stopped and processing returns to ST07 of FIG. 6.

Figure 15A:
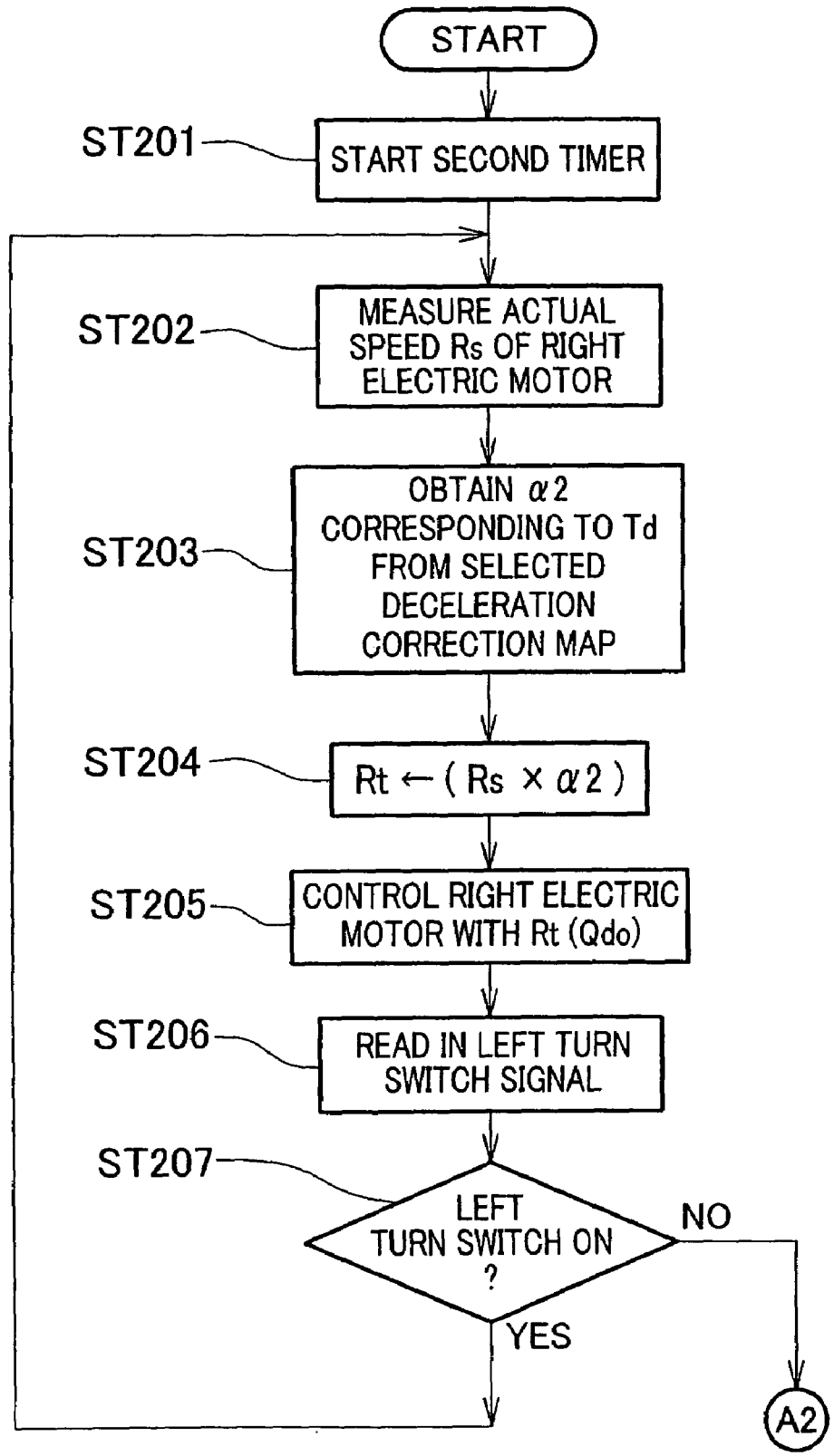
FIG. 15A and FIG. 15B are flow charts showing a subroutine for actually executing control of a motor on the outside of a turn when the vehicle is Not At Work shown in ST07 of FIG. 6.
Figure 15B:
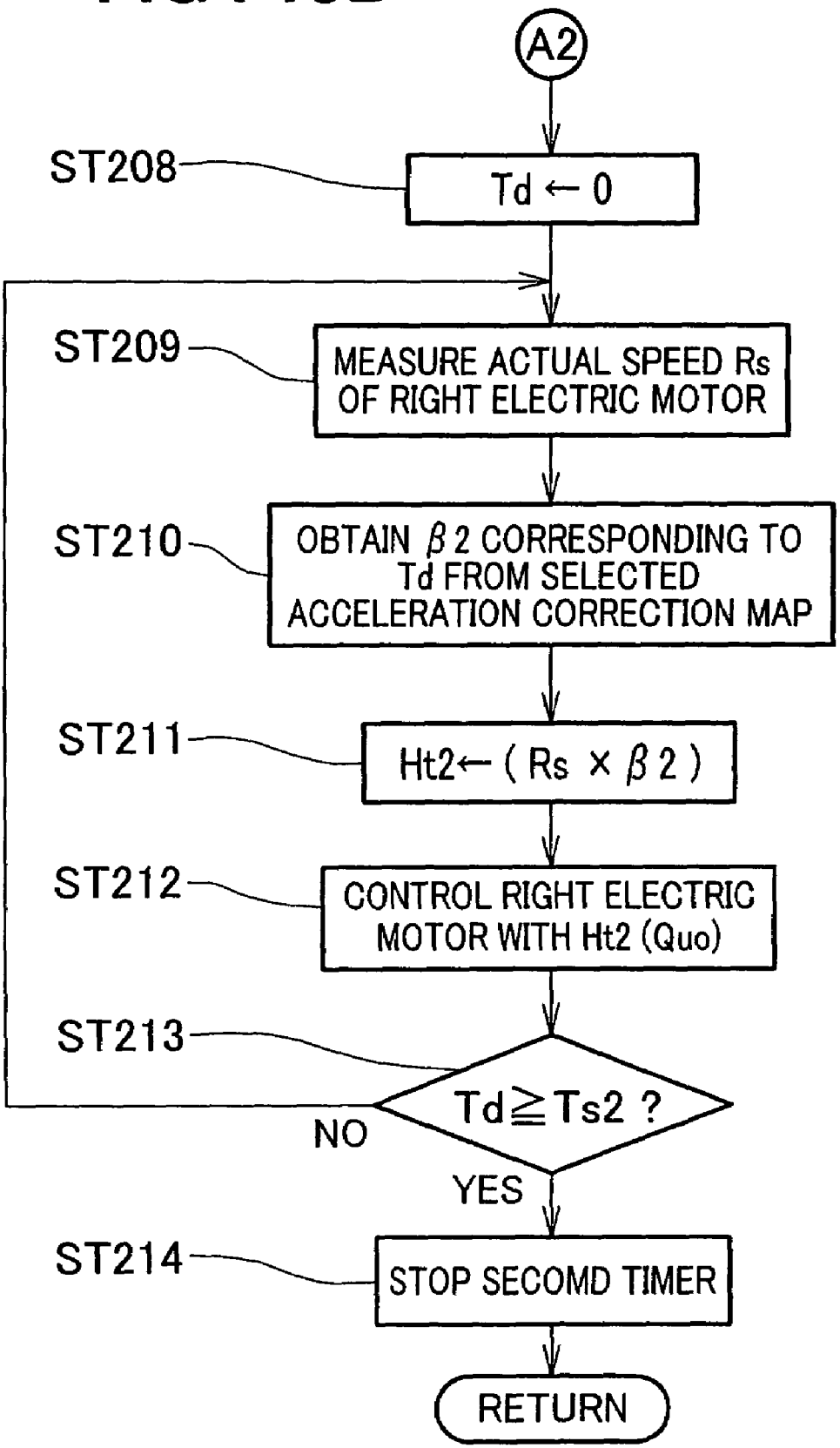

FIGS. 15A and 15B show a subroutine for executing control of the right electric motor, which is the motor on the outside of the turn, in ST07 of FIG. 6.

ST201: A second timer built into the control part 56 is reset (to count time Td=0) and then started.

S202: The actual speed Rs of the right electric motor (the motor on the outside of the turn) 33R is measured. The actual speed Rs can be measured for example by measuring the present speed of the right electric motor 33R with the rotation sensor 98R shown in FIG. 4.

ST203: From the selected outside motor deceleration pattern, that is, the pattern selected from the motor deceleration correction coefficient maps Mdo1 to Mdo3 shown in FIG. 12, a deceleration correction coefficient β2 is obtained from the count time Td. All that is necessary is that a deceleration correction coefficient α2 corresponding to variation in the count time Td be obtained.

ST204: The actual speed Rs of the right electric motor 33R is multiplied by the above-mentioned deceleration correction coefficient α2 to obtain a deceleration target speed Rt of the right electric motor 33R.

ST205: Deceleration control of the motor on the outside of the turn 33R is executed with a deceleration control signal Qdo based on the deceleration target speed Rt.

ST206: The switch signal of the left turn control switch 81L is read in as an input signal.

ST207: It is checked whether or not the left turn control switch 81L is ON. If YES then it is inferred that the turning manoeuver is being continued and processing returns to ST202. If NO then it is inferred that the turning manoeuver has ended (that a control-release signal of when the control was released has been received), and processing proceeds to ST208 of FIG. 15B.

ST208: The count time Td of the second timer is reset to 0. The second timer continues counting.

ST209: The actual speed Rs of the right electric motor 33R is measured.

ST210: From the selected outside motor acceleration pattern, that is, from the pattern selected from among the acceleration correction coefficient maps Muo1 to Muo3 shown in FIG. 13, an acceleration correction coefficient β2 is obtained from the count time Td. All that is necessary is that an acceleration correction coefficient β2 corresponding to variation in the count time Td be obtained.

ST211: The actual speed Rs of the right electric motor 33R is multiplied by the acceleration correction coefficient β2 to obtain an acceleration target speed Ht2 of the right electric motor 33R.

ST212: Acceleration control of the right electric motor 33R is carried out with an acceleration control signal Quo based on the acceleration target speed Ht2. That is, the actual speed Rs is increased by the acceleration target speed Ht2.

ST213: It is checked whether or not the count time of the second timer (elapsed time) Td has reached a preset fixed second reference time Ts2. If YES then it is inferred that acceleration control of the right electric motor 33R of when the switch to straight-line travel was made has ended, and processing proceeds to ST214. If NO then processing returns to ST209.

ST214: The second timer is stopped and processing returns to ST07 of FIG. 6.

In the control flow described above, the deceleration control signals Qdi, Qdo and the acceleration control signals Qui, Quo are equivalent to PI signals in PI control and to PID signals in PID control.

The drive control method of the left and right electric motors 33L, 33R is for example pulse width modulation (PWM), in which pulse voltages are supplied to the motor terminals. In this case, the motor drivers 37L, 37R generate pulse signals with pulse widths controlled in correspondence with the deceleration control signals Qdi, Qdo or the acceleration control signals Qui, Quo and control the electric motors 33L, 33R with these pulse signals.

As described above, the snow-remover 10 of this first preferred embodiment has on a machine body 11 left and right transporting parts 20L, 20R, left and right electric motors 33L, 33R for driving these transporting parts 20L, 20R, a control part 56 for controlling these electric motors 33L, 33R, and a direction/speed lever (target speed adjusting member) 75 for supplying a target travel speed command of the electric motors 33L, 33R to the control part 56, and also has left and right push-button type turn switches 81L, 81R. The left and right transporting parts 20L, 20R are crawlers.

Of the left and right electric motors 33L, 33R, the electric motor corresponding to the turn switch 81L (or 81R) being operated will be called the electric motor 33L (or 33R) on the inside of the turn, and the other will be called the electric motor 33R (or 33L) on the outside of the turn.

It is a characteristic feature of the control part 56 that it has inside motor deceleration pattern selecting means for, when receiving an operating signal from the left or right turn switch 81L (or 81R), selecting one deceleration pattern from among a plurality of preset deceleration patterns (see FIG. 8 to FIG. 10) for the motor on the inside of the turn on the basis of a target travel speed Ts determined by the direction/speed lever 75 at the time when the left or right turn switch 81L (or 81R) was operated, and also has inside motor deceleration control means for executing deceleration control of the motor 33L (or 33R) on the inside of the turn, only for as long as the turn switch 81L (or 81R) is being pressed, using a deceleration control signal Qdi based on the selected inside motor deceleration pattern.

The inside motor deceleration pattern selecting means is made up of ST03 to ST06 and ST08, ST09 of FIG. 6 and ST21 to ST30 of FIG. 7. The inside motor deceleration control means is made up of ST101 to ST107 of FIG. 14A.

Accordingly, just by simply continuing to press a left or right bush-button turn switch 81L (or 81R) it is possible to decelerate the corresponding motor 33L (or 33R) on the inside of the turn in accordance with a deceleration pattern corresponding to the target travel speed Ts set with the direction/speed lever (target speed adjusting member) 75 immediately before the turn. Consequently, compared to a case where the degree of deceleration of the motor 33L (or 33R) on the inside of the turn is adjusted by gripping a lever as in handle-lever type turning control means of related art, extremely simple turning control is possible. The operator can perform turning control easily without needing any skill, and the turning controllability of the vehicle is increased.

The snow-remover 10 turns in accordance with the turning control feeling of the operator. For example, the snow-remover 10 can be turned with the same turning control feeling as when handle-lever type turning control means is operated. Because deceleration can be effected in accordance with a deceleration pattern corresponding to any pre-turn target travel speed Ts, the responsiveness of the control output with respect to deceleration maneuvers is good, and the snow-remover 10 turns in an optimal state.

Also, because the motor 33L (or 33R) on the inside of the turn is deceleration-controlled with a push-button type turn switch 81L (or 81R), the operating force of the turning control is lightened, and the effort of the operator is further reduced.

Because this turning control means is push-button type turn switches 81L, 81R, its construction is simple compared to handle-lever type turning control means of related art, and operation of a lever and adjustment of a control signal level corresponding to this are unnecessary.

The target travel speed Ts immediately before the turn is set to an optimal speed by the operator himself, taking into account travel conditions such as the road surface and considering the present ground-covering ability of the snow-remover 10. On the basis of this optimal target travel speed Ts, the snow-remover is turned while being decelerated in accordance with a motor deceleration pattern for use on turning. As a result, the ground-covering ability of the snow-remover 10 on turning increases.

Also, because in the deceleration correction coefficient maps Mdi1 to Mdi6 for the inside motor shown in FIG. 8 to FIG. 10 the deceleration correction coefficient α1 gradually decreases with the elapsing of the time Tc, the motor 33L (or 33R) on the inside of the turn decelerates in correspondence with the elapsing of the time Tc.

It is a characteristic feature of the control part 56 of this invention that, from when it receives a control-release signal at the time when the left or right turn switch 81L (or 81R) is released (ST107 in FIG. 14A), it executes acceleration control of the motor 33L (or 33R) on the inside of the turn using an acceleration control value Qui based on a predetermined motor acceleration pattern (see FIG. 11).

The acceleration control of the motor on the inside of the turn is inside motor acceleration control means consisting of ST107 of FIG. 14A and ST108 to ST113 of FIG. 14B. As described above, the acceleration control value Qui is a value obtained by adding a fixed value Quic to the minimum value Quim of the acceleration control value that would otherwise have been assumed at the time when the control-release signal was received (Qui=Quim+Quic).

From when the turn switch 81L (or 81R) is released, the snow-remover 10 is switched to straight-line travel by acceleration control of the motor 33L (or 33R) on the inside of the turn being carried out with the acceleration control signal.

In this case, the value obtained by adding a fixed value Quic to the minimum value Quim of the acceleration control value is made the acceleration control value Qui of when control of the turn switch 81L (or 81R) is released. That is, at the time of the switch to straight-line travel, the acceleration control signal Qui pertaining to the motor 33L (or 33R) on the inside of the turn is raised at a stroke. As a result, the motor 33L (or 33R) on the inside of the turn is sharply accelerated. As a result, the speed difference between the speed Rs (or Ls) of the motor 33R (or 33L) on the outside of the turn and the speed Ls (or Rs) of the motor 33L (or 33R) on the inside of the turn is rapidly eliminated. Consequently, the snow-remover 10 is swiftly switched from turning travel to straight-line travel. In this way, the snow-remover 10 can be switched easily and swiftly from turning travel to straight-line travel so as to match the operation feel of the operator.

In particular, when the left and right transporting parts 20L, 20R are crawlers, they have a strength of ground contact and size of driving force peculiar to crawlers. Because of this, when the snow-remover 10 is operated to shift from turning travel to straight-line travel, it does not readily switch rapidly. With respect to this, in this invention, by the motor 33L (or 33R) on the inside of the turn being accelerated at a stroke, the speed difference between the left and right crawlers is rapidly eliminated and the switch to straight-line travel can be made quickly.

Also, the snow-remover 10 has a snow-removal working part 40 and a work switch 73 for turning on and off this snow-removal working part 40, and depending on whether the snow-removal working part 40 is on or off the travel resistance of the transporting parts 20L, 20R varies.

It is a characteristic feature of the multiple deceleration patterns for the motor on the inside of the turn (see FIG. 8 to FIG. 10) that the patterns also differ according to whether the work switch 73 is on or off.

It is a characteristic feature of the control part 56 that it is constructed to select one pattern from among multiple deceleration patterns (see FIG. 8 to FIG. 10) on the basis of a combination of the on/off-signal of the work switch 73 and a target travel speed Ts as of when the left or right turn switch 81L (or 81R) was operated (ST02 to ST06 and ST08 to ST09 of FIG. 6 and ST21 to ST30 of FIG. 7).

Therefore, in the case of an snow-remover 10 in which the travel resistance of the transporting parts 20L, 20R varies with whether the snow-removal working part 40 is on or off, as in the case of a snow-remover, it is possible to perform finer turning control by making the multiple inside motor deceleration patterns ones which differ also with whether the work switch 73 is on or off.

It is also a characteristic feature of the control part 56 that it has outside motor deceleration pattern selecting means for, when receiving an operating signal from the left or right turn switch 81L (or 81R), selecting one deceleration pattern from among a plurality of different preset deceleration patterns (see FIG. 12) for the motor on the outside of the turn on the basis of a target travel speed Ts of the time when the left or right turn switch 81L (or 81R) was operated, and also has outside motor deceleration control means for executing deceleration control of the motor 33R (or 33L) on the outside of the turn, only for as long as the turn switch 81L (or 81R) is being pressed, using a deceleration control signal Qdo based on the selected outside motor deceleration pattern.

The outside motor deceleration pattern selecting means is based on ST03 to ST06 and ST08, ST09 of FIG. 6 and ST21 to ST24 and ST31 to ST36 of FIG. 7. The outside motor deceleration control means is based on ST201 to ST207 of FIG. 15A.

Accordingly, when the snow-remover 10 is turned, because a deceleration pattern of the motor on the outside of the turn is selected on the basis of the target travel speed Ts of the time when the turn switch 81L (or 81R) was operated and on the basis of that deceleration pattern the motor 33R (or 33L) on the outside of the turn is also decelerated, the snow-remover 10 can be made to turn more smoothly.

It is also a characteristic feature of the control part 56 of this invention that it has outside motor acceleration control means for, from when it receives a control-release signal of when the control of the left or right turn switch 81L (or 81R) was released (ST207 of FIG. 15A), executing acceleration control of the motor 33R (or 33L) on the outside of the turn using an acceleration control signal Quo based on a preset motor acceleration pattern (see FIG. 13).

The outside motor acceleration control means is made up of ST207 of FIG. 15A and ST208 to ST213 of FIG. 15B.

Accordingly, when the snow-remover 10 is turned, because an acceleration pattern of the motor on the outside of the turn is selected on the basis of the target travel speed Ts of the time when the turn switch 81L (or 81R) was operated and on the basis of that acceleration pattern the motor 33R (or 33L) on the outside of the turn is also accelerated, the snow-remover 10 can be made to turn more smoothly.

Thus, in this invention, when the snow-remover 10 is turned, not only is deceleration control of the motor 33L (or 33R) on the inside of the turn executed but also deceleration control of the motor 33R (or 33L) on the outside of the turn is also executed. After the turn is completed, not only is acceleration control of the motor 33L (or 33R) on the inside of the turn executed but also acceleration control of the motor 33R (or 33L) on the outside of the turn is executed.

Therefore, the snow-remover 10 turns more smoothly, and turning characteristics suited to the nature of the snow-remover 10 are obtained.

Also, with the deceleration correction coefficient maps Mdo1 to Mdo3 for the 1otor on the outside of the turn shown in FIG. 12, it is possible to gradually reduce and then make constant a deceleration correction coefficient $\alpha 2$ after the start of a turn. Then, with the acceleration correction coefficient maps Muo1 to Muo3 for the motor on the outside of the turn shown in FIG. 13, it is possible to gradually increase an acceleration correction coefficient $\beta 2$ after the turn is completed. As a result, at the time of turning it is possible to decrease the speed of the motor 33R (or 33L) on the outside of the turn as the elapsed time Td elapses, and at the end of turning it is possible to increase the speed of the motor 33R (or 33L) on the outside of the turn as the elapsed time Td elapses.

When the target travel speed Ts is large, the snow-remover 10 can be made to make large turns, and when the target travel speed Ts is small, the snow-remover 10 can be made to make small turns. In particular, in the case of a working machine like the snow-remover 10 used as an example in this preferred embodiment, it is possible to provide turning characteristics suited to the nature of the working machine.

The characteristic curves of the deceleration correction coefficients $\alpha 1$, $\alpha 2$ and the characteristic curves of the acceleration correction coefficients $\beta 1$ and $\beta 2$ expressed by the maps may alternatively be obtained using computation formulas.

Also, although in this preferred embodiment the direction/speed lever was a single lever, alternatively its functions may be divided among a plurality of different levers. The direction and speed control member may be a lever, a dial, a switch or any other equivalent component. Similarly, the travel preparation member may be a lever, a dial, a switch or any other equivalent component.

Also, by increasing the number of types of deceleration correction coefficient maps and acceleration correction coefficient maps (the number of different characteristic curves) selected in correspondence with the target travel speed Ts as necessary, it is possible to carry out speed control more finely.

Also, the maps expressing the characteristic curves of the deceleration correction coefficients $\alpha 1$, $\alpha 2$ and the characteristic curves of the acceleration correction coefficients $\beta 1$, $\beta 2$ are not limited to two-dimensional maps of elapsed time versus correction coefficient. For example, they may alternatively be three-dimensional maps of elapsed time, correction coefficient and target travel speed.

The maps are preset in internal memory of the control part 56 so that in the steps of the control flow charts described above the maps can be read out as necessary and correction coefficients set. In FIG. 8 to FIG. 13 to facilitate understanding the maps have been shown schematically, but the forms of the maps are not limited to these and can be set freely.

Next, turning control of a snow-remover according to a second preferred embodiment of the invention will be described, on the basis of FIG. 16, FIGS. 17A and 17B and FIGS. 18A and 18B with reference also to FIG. 4 and FIGS. 8 to 13.

Figure 16:
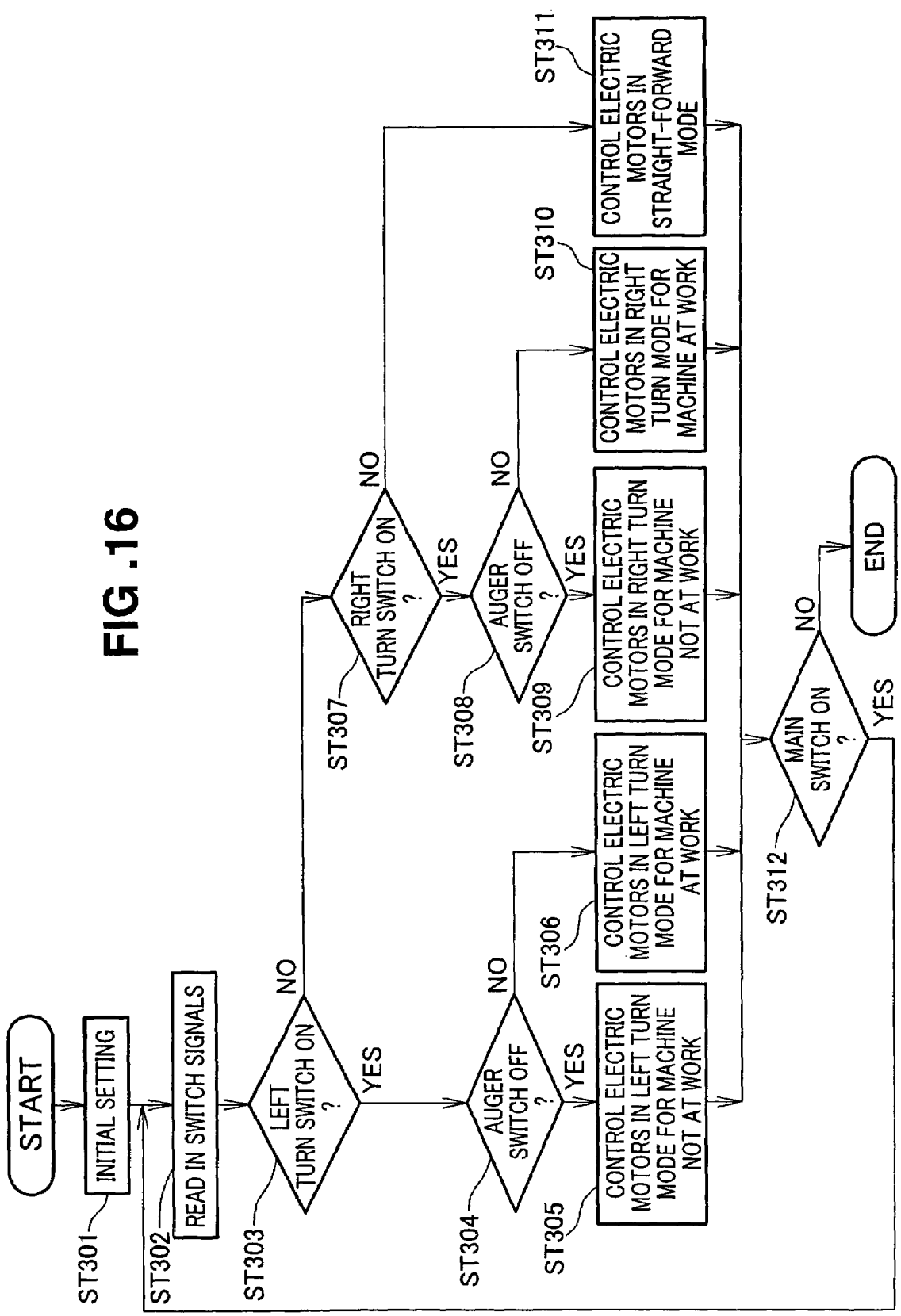
FIG. 16 is a flow chart of a control part according to a second preferred embodiment of the invention.

In FIG. 16, ST301: Initial setting is carried out.

ST302: Switch signals (including lever position signals) of the main switch 71, the direction/speed lever 75, the switching means 77a of the travel preparation lever 77, and the left and right turn switches 81L, 81R and so on are read in as input signals.

ST303: It is checked whether or not the left turn switch 81L is on, and if YES then processing proceeds to ST304 and if NO then processing proceeds to ST307.

ST304: It is checked whether or not the auger switch (work switch) 73 is off, and if YES then processing proceeds to ST305 and if NO then it is inferred that the auger switch 73 is on and processing proceeds to ST306.

ST305: The electric motors 33L, 33R are controlled in a left turn mode for when the machine is Not At Work (i.e. when the snow-removal working part 40 is OFF). A subroutine for actually executing this ST305 will be described later with reference to FIG. 17A and FIG. 17B.

ST306: The electric motors 33L, 33R are controlled in a left turn mode for when the machine is At Work (i.e. when the snow-removal working part 40 is ON). The control of this ST306 consists of essentially the same control steps as the control of the above-mentioned ST305, except that as mentioned above the 'inside motor deceleration pattern' is different.

ST307: It is checked whether or not the right turn control switch 81R is on, and if YES then processing proceeds to ST308 and if NO then processing proceeds to ST311.

ST308: It is checked whether or not the auger switch 73 is off, and if YES then processing proceeds to ST309 and if NO then it is inferred that the auger switch 73 is on and processing proceeds to ST310.

ST309: The electric motors 33L, 33R are controlled in a right turn mode for when the machine is Not At Work (i.e. when the snow-removal working part 40 is OFF). The control of this ST309 consists of essentially the same control steps as the control of the above-mentioned ST305, except that right turn control is executed instead of left turn control.

ST310: The electric motors 33L, 33R are controlled in a right turn mode for when the machine is At Work (i.e. when the snow-removal working part 40 is ON). The control of this ST310 consists of essentially the same control steps as the control of the above-mentioned ST306, except that right turn control is carried out instead of left turn control.

ST311: Because the left and right turn switches 81L, 81R are both OFF, the electric motors 33L, 33R are controlled in a straight-forward mode. That is, the snow-remover 10 is driven straight forward.

ST312: It is checked whether or not the main switch 71 is in its 'On' position, and if YES then it is determined that this control is to be continued and processing returns to ST302, and if NO then this control is ended.

Figure 17A:
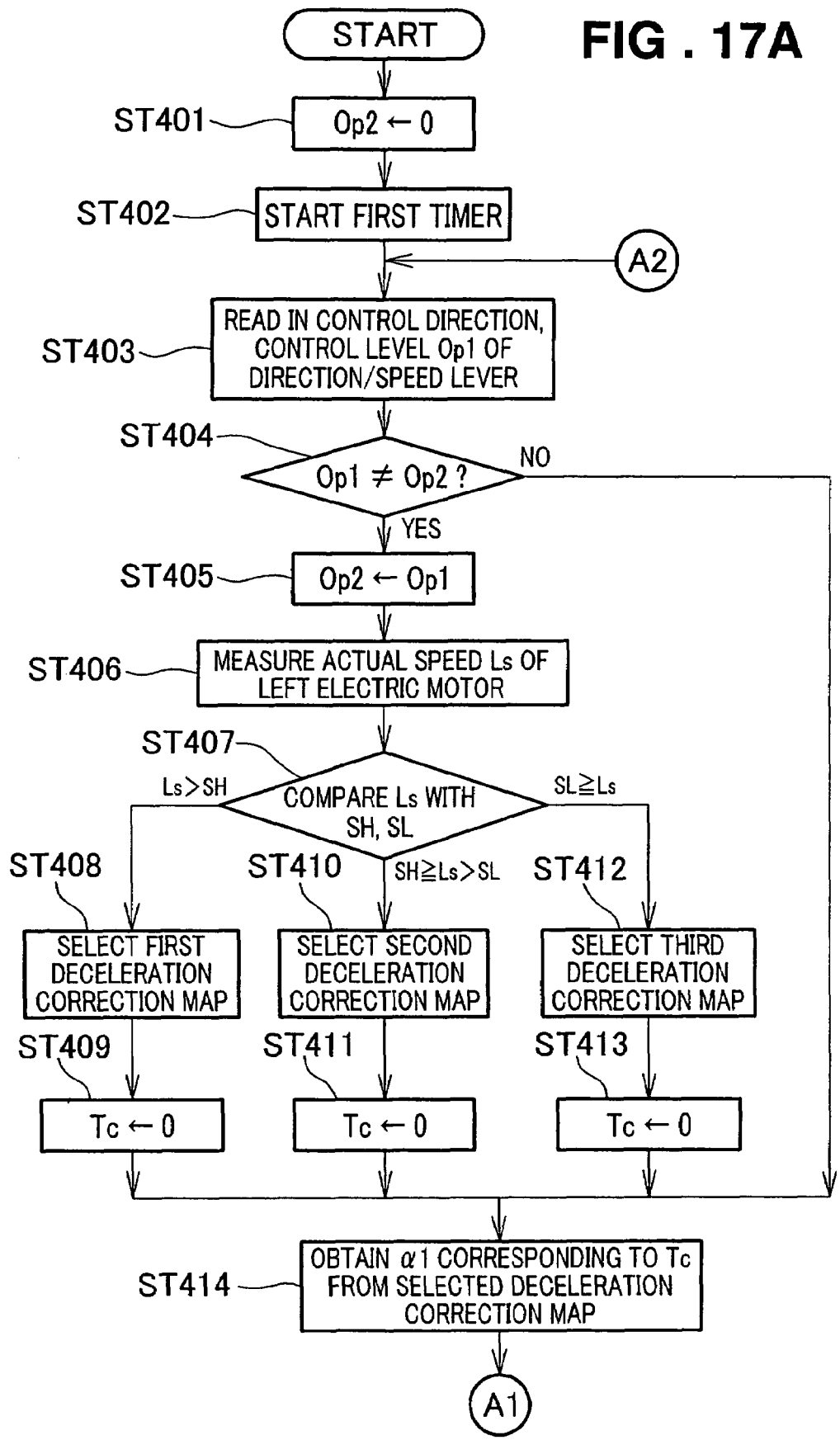
FIG. 17A and FIG. 17B are flow charts showing a subroutine for actually executing control of a motor on the inside of the turn during a left turn when the vehicle is Not At Work shown in ST305 of FIG. 16.
Figure 17B:
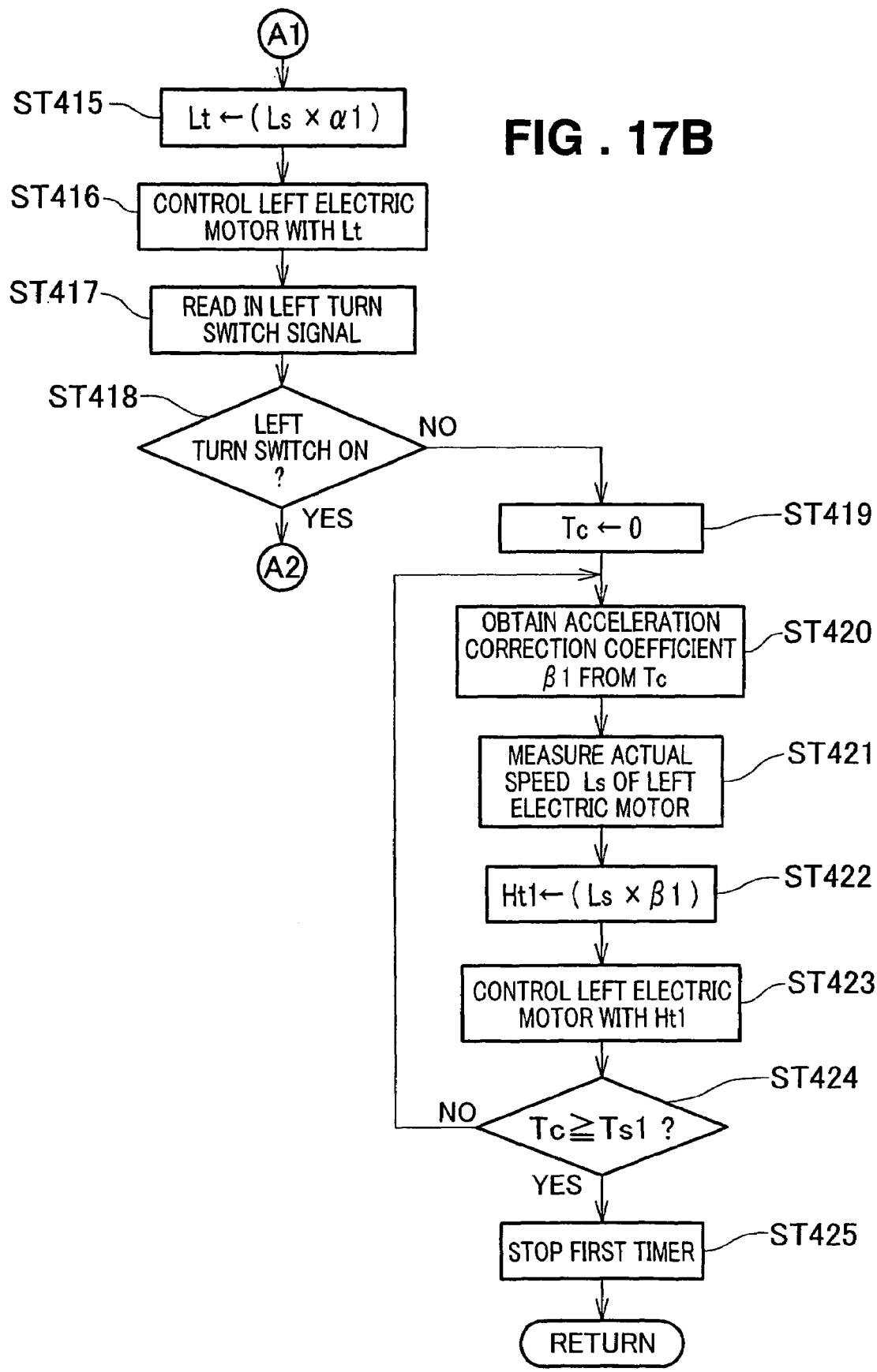
Figure 18A:
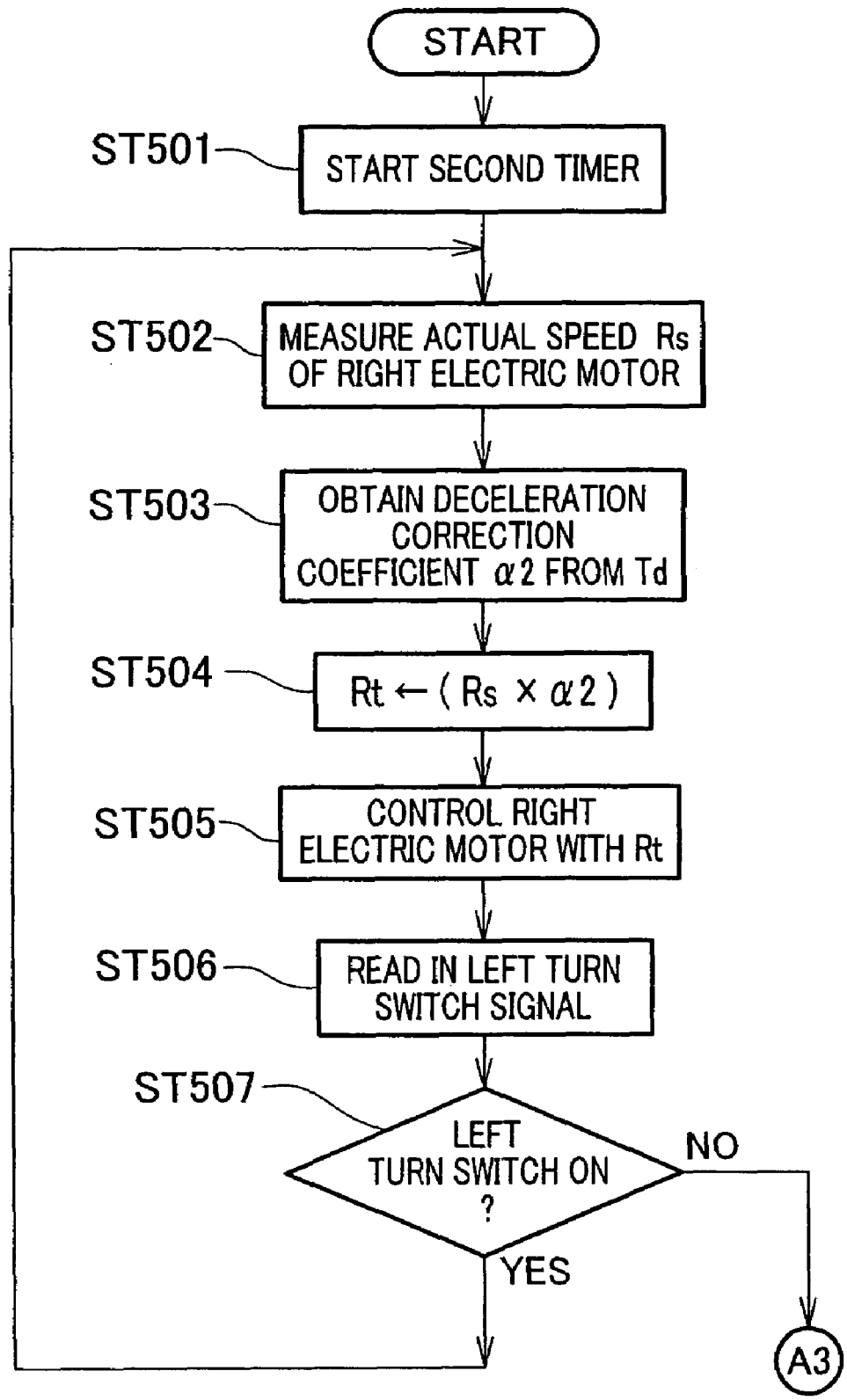
FIG. 18A and FIG. 18B are flow charts showing a subroutine for actually executing control of a motor on the outside of a turn when the vehicle is Not At Work shown in ST305 of FIG. 16.
Figure 18B:
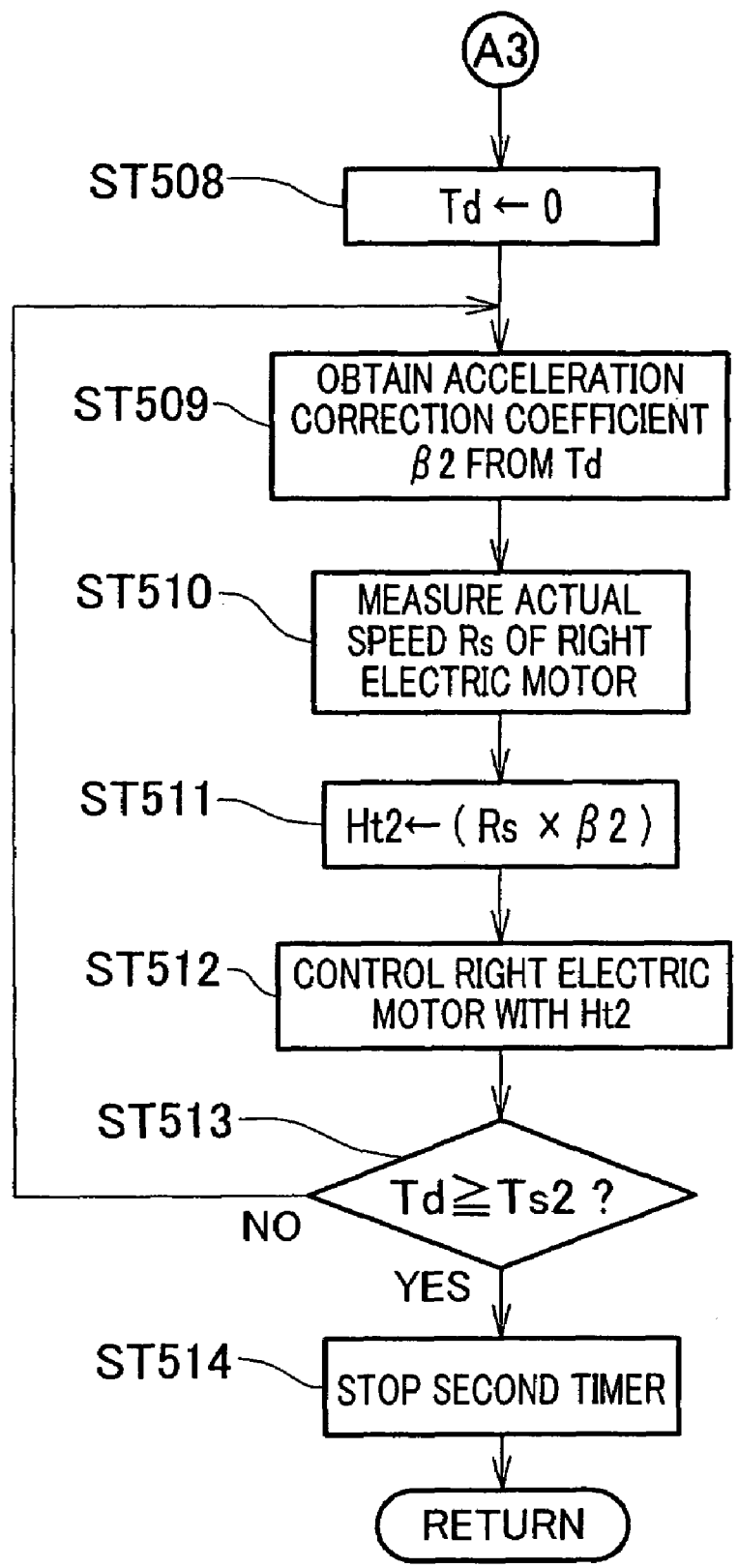
Figure 19:
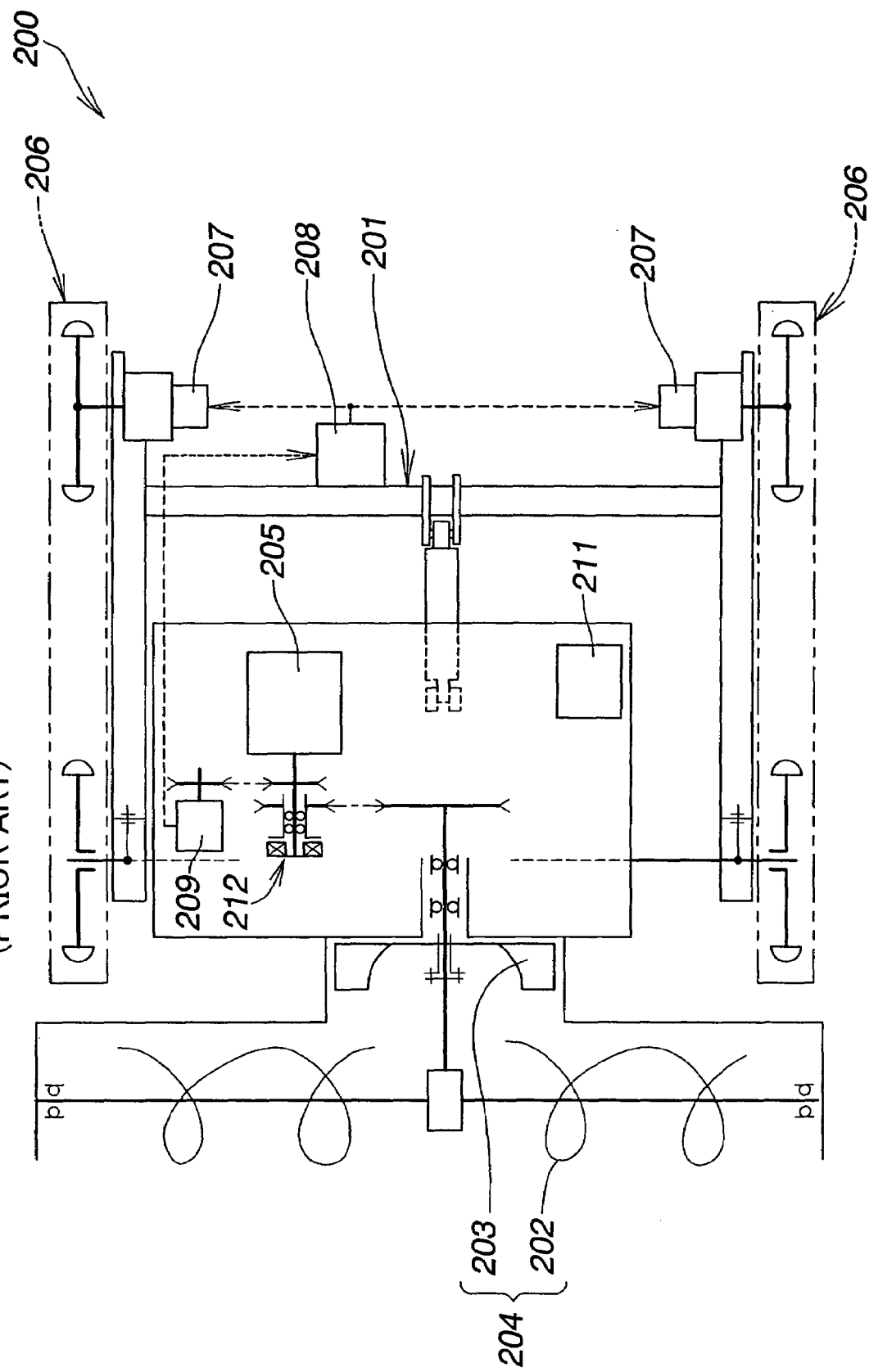
FIG. 19 is a view showing a snow-remover of related art.

Next, a subroutine for actually executing the left turn mode control for when the machine is Not At Work (i.e. the snow-removal working part 40 is OFF) shown in ST305 of FIG. 16 will be described, on the basis of FIGS. 17A and 17B and FIGS. 18A and 18B. FIGS. 17A and 17B show control of the left electric motor 33L (the motor on the inside of the turn) at the time of a left turn, and FIGS. 18A and 18B show control of the right electric motor 33R (the motor on the outside of the turn). The control of the left electric motor and the control of the right electric motor are both essentially executed simultaneously by parallel processing or time-allocated processing.

First, the left turn mode control of the left electric motor when the machine is Not At Work shown in FIGS. 17A and 17B will be described.

ST401: A control level of the direction/speed lever 75 (hereinafter, old lever control level) Op2 selected previously and stored in memory of the control part 56 is reset to 0.

ST402: A first timer built into the control part 56 is reset (count time Tc=0) and then started.

ST403: The control direction and control level Op1 (present lever control level Op1) of the direction/speed lever 75 are read in. This control level Op1 is determined by the position of the direction/speed lever 75.

ST404: It is checked whether or not the present lever control level Op1 and the old lever control level Op2 are different (Op1≠Op2), and if YES then it is inferred that there has been a change in the lever position and processing proceeds to ST405. If NO then it is inferred that there has not been a change of lever position and processing proceeds to ST414.

ST405: The old lever control level Op2 stored in memory is updated to the value of the present lever control level Op1.

ST406: Because in ST303 of FIG. 16 the left turn switch 81L is ON, the actual speed Ls of the left electric motor (the motor on the inside of the turn) 33L is measured. The actual speed Ls can be measured for example by measuring the present speed of the electric motor 33L with the rotation sensor 98L of FIG. 4.

ST407: The actual speed Ls of the left electric motor 33L is compared with preset speed threshold values (a high-speed threshold value SH and a low-speed threshold value SL).

If the actual speed Ls is greater than the high-speed threshold value SH, it is inferred that the actual speed Ls is in a high speed range (high speed travel range) and processing proceeds to ST408. If the actual speed Ls is between the low-speed threshold value SL and the high-speed threshold value SH, it is inferred that the actual speed Ls is in a medium speed range (medium speed travel range) and processing proceeds to ST410. If the actual speed Ls is in the range between 0 and the low-speed threshold value SL, it is inferred that the actual speed Ls is in a low speed range (low speed travel range) and processing proceeds to ST412.

ST408: One pattern, that is, a first pattern, is selected from among multiple preset inside motor deceleration patterns having different deceleration correction coefficient characteristics. Specifically, of the inside motor deceleration correction coefficient maps shown in FIG. 8, the first deceleration correction coefficient map Mdi1 for when the vehicle is Not At Work is selected. When the vehicle is At Work, the second deceleration correction coefficient map Mdi2 shown in with a dashed line is selected.

In this second preferred embodiment, the deceleration maps and acceleration maps used are the same as the maps shown in FIG. 8 to FIG. 13 of the first preferred embodiment with the actual speeds Ls, Rs of the left and right electric motors 33L, 33R used instead of the target travel speed Ts, and the curves themselves are the same; therefore, the maps of FIG. 8 to FIG. 13 of the first preferred embodiment will be used in the description of the second preferred embodiment.

ST409: The count time Tc of the first timer is reset to 0. The first timer continues counting.

ST410: One pattern, that is, a second pattern, is selected from among multiple preset inside motor deceleration patterns having different deceleration correction coefficient characteristics. Specifically, of the inside motor deceleration correction coefficient maps shown in FIG. 9, the third deceleration correction coefficient map Mdi3 for when the vehicle is Not At Work is selected. When the vehicle is At Work, the fourth deceleration correction coefficient map Mdi4 shown with a dashed line is selected.

ST411: The count time Tc of the first timer is reset to 0. The first timer continues counting.

S412: One pattern, that is, a third pattern, is selected from among multiple preset inside motor deceleration patterns having different deceleration correction coefficient characteristics. Specifically, of the inside motor deceleration correction coefficient maps shown in FIG. 10, a fifth deceleration correction coefficient map Mdi5 for when the vehicle is Not At Work is selected. When the vehicle is At Work, a sixth deceleration correction coefficient map Mdi6 shown with a dashed line is selected.

ST413: The count time Tc of the first timer is reset to 0. The first timer continues counting.

ST414: A deceleration correction coefficient $\alpha 1$ corresponding to the count time Tc is obtained from the selected inside motor deceleration pattern, i.e. the inside motor deceleration correction coefficient map selected from FIG. 8, FIG. 9 or FIG. 10, and then processing proceeds to ST415 of FIG. 17B. All that is necessary is that a deceleration correction coefficient $\alpha 1$ corresponding to variation in the count time Tc be obtained.

As mentioned above, in the deceleration correction coefficient maps shown in FIG. 8, the resistance to travel of the transporting parts 20L, 20R of the snow-remover 10 varies with whether the snow-removal working part 40 such as an auger is ON or OFF. Because when the vehicle is At Work the resistance to travel is large, the travel speed of the transporting parts 20L, 20R is lower than when the vehicle is Not At Work. Because of this, the second deceleration correction coefficient $\alpha 1$ for when the vehicle is At Work shown with a dashed line is set to a smaller characteristic than the first deceleration correction coefficient $\alpha 1$ for when the vehicle is Not At Work shown with a solid line.

FIG. 17B, ST415: The actual speed Ls of the left electric motor 33L is multiplied by the deceleration correction coefficient $\alpha 1$ to obtain a deceleration target speed Lt of the left electric motor 33L.

ST416: Deceleration control of the left electric motor 33L is executed using a deceleration control signal Qdi (not shown) based on the deceleration target speed Lt.

ST417: The switch signal of the left turn switch 81L is read in as an input signal.

ST418: It is checked whether or not the left turn switch 81L is On. If YES then it is inferred that the turning operation is continuing, and processing returns to ST403 of FIG. 17A. If NO then it is inferred that the turning operation has been ended, and processing proceeds to ST419.

ST419: The count time Tc of the first timer is reset to 0. The first timer continues counting.

ST420: An acceleration correction coefficient $\beta 1$ corresponding to the count time Tc is obtained from a preset inside motor acceleration pattern, that is, from the acceleration correction coefficient map Mui for the motor on the inside of the turn shown in FIG. 11. All that is necessary is that an acceleration correction coefficient $\beta 1$ corresponding to variation in the count time Tc be obtained.

ST421: An actual speed Ls of the left electric motor 33L is measured.

ST422: The actual speed Ls of the left electric motor 33L is multiplied by the acceleration correction coefficient $\beta 1$ to obtain an acceleration target speed Ht1 of the left electric motor 33L.

ST423: Acceleration control of the left electric motor 33L is executed using a acceleration control signal Qui (not shown) based on the acceleration target speed Ht1.

ST424: It is checked whether or not the count time (elapsed time) Tc of the first timer has reached a preset constant first reference time Ts1. If YES then it is inferred that acceleration control of the left electric motor 33L of when the vehicle is switched to straight-line travel has ended, and processing proceeds to ST425. If NO then processing returns to ST420.

ST425: The first timer is stopped, and processing returns to ST305 of FIG. 16.

As mentioned above with reference to ST422 and ST423 of FIG. 17B, the acceleration control signal output value Qui (not shown) to the left electric motor 33L is a value corresponding to the acceleration correction coefficient $\beta 1$. If the acceleration correction coefficient $\beta 1$ greatly increases, the acceleration control signal output Qui also greatly increases.

In other words, the acceleration control signal output value Qui to the left electric motor 33L is the value obtained by adding a fixed value Quic to the minimum output value Quim of the acceleration control signal that would otherwise have been assumed at the time when the left turn switch 81L turned OFF, i.e. at the time when a control-release signal was received (Qui=Quim+Quic). Quim and Quic are not shown in the drawings.

Because the acceleration correction coefficient $\beta 1$, that is, the acceleration control signal output value Qui, of the left electric motor 33L at the time when the left turn switch 81L turns OFF (the time when the elapsed time Tc is 0), is extremely large, the left electric motor 33L is accelerated at a stroke and the speed difference between the left and right electric motors 33L, 33R is eliminated rapidly.

FIGS. 18A and 18B show a subroutine for actually executing left turn mode control of the motor on the outside of the turn (the right electric motor) when the vehicle is Not At Work.

S501: A second timer built into the control part 56 is reset (count time Td=0) and then started.

ST502: The actual speed Rs of the right electric motor 33R, which is the motor on the outside of the turn, is measured. The actual speed Rs can be measured for example by measuring the present speed of the right electric motor 33R with the rotation sensor 98R of FIG. 4.

ST503: A deceleration correction coefficient $\alpha 2$ corresponding to the count time Td is obtained from a preset outside motor deceleration pattern, that is, from an outside motor deceleration correction coefficient map shown in FIG. 12. All that is necessary is that a deceleration correction coefficient $\alpha 2$ corresponding to variation in the count time Td be obtained.

ST504: The actual speed Rs of the right electric motor 33R is multiplied by the outside motor deceleration correction coefficient $\alpha 2$ to obtain a deceleration target speed Rt of the right electric motor 33R.

ST505: Deceleration control of the right electric motor 33R is executed using a deceleration control signal output value Qdo (not shown) based on the deceleration target speed Rt.

ST506: The switch signal of the left turn switch 81L is read in as an input signal.

ST507: It is checked whether or not the left turn switch 81L is On. If YES then it is inferred that the turning operation is continuing and processing returns to ST502. If NO then it is inferred that the turning operation has ended, and processing proceeds to ST508 of FIG. 18B.

Here, the deceleration correction coefficient $\alpha 2$ curves in FIG. 12 are curves based on the result of a comparison between the actual speed Rs of the right electric motor 33R and the speed threshold values (the high-speed threshold value SH and the low-speed threshold value SL) discussed with reference to ST407 of FIG. 17A.

That is, if the actual speed Rs is greater than the high-speed threshold value SH (Rs>SH), then because the actual speed Rs is in a high speed range (high travel speed range), the characteristic curve Mdo1 of the deceleration correction coefficient α2 shown with a broken line is used.

If the actual speed Rs is between the low-speed threshold value SL and the high-speed threshold value SH (SH≧Rs>SL), then because the actual speed Rs is in a medium speed range (medium speed travel range) the characteristic curve Mdo2 of the deceleration correction coefficient α2 shown with a solid line is used.

If the actual speed Rs is between 0 and the low-speed threshold value SL (SL≧Rs), then because the actual speed Rs is in a low speed range (low speed travel range), the characteristic curve Mdo3 of the deceleration correction coefficient α2 shown with a dashed line is used.

In ST503 of FIG. 18A, on the basis of the actual speed Rs of the right electric motor 33R at the time when the elapsed time Td is 0 (msec), a deceleration correction coefficient α2 is obtained using one curve selected from the three different characteristic curves.

FIG. 18B, ST508: The count time Td of the second timer is reset to 0. The second timer continues counting.

ST509: An acceleration correction coefficient β2 corresponding to the count time Td is obtained from a preset outside motor acceleration pattern, that is, the acceleration correction coefficient map for the outside motor shown in FIG. 13. All that is necessary is that an acceleration correction coefficient β2 corresponding to variation in the count time Td be obtained.

ST510: The actual speed Rs of the right electric motor 33R is measured.

ST511: The actual speed Rs of the right electric motor 33R is multiplied by the acceleration correction coefficient β2 to obtain an acceleration target speed Ht2 of the right electric motor 33R.

ST512: Acceleration control of the motor 33R on the outside of the turn is executed using an acceleration control signal output value Quo (not shown) based on the acceleration target speed Ht2.

ST216: It is checked whether or not the count time Td of the second timer (the elapsed time) has reached a constant second reference time Ts2. If YES then it is inferred that acceleration control of the right electric motor 33R of when the vehicle is switched to straight-line travel has ended and processing proceeds to ST514. If NO then processing returns to ST509.

ST217: The second timer is stopped and processing returns to ST305 of FIG. 16.

Here, the characteristic curves of the acceleration correction coefficient β2 shown in FIG. 13 are curves selected on the basis of a comparison of the actual speed Rs of the right electric motor 33R and the speed threshold values discussed with reference to ST407 of FIG. 17A (the high-speed threshold value SH and the low-speed threshold value SL).

That is, if the actual speed Rs is greater than the high-speed threshold value SH (RS>SH), then because the actual speed Rs is in a high speed region (high travel speed regions) the acceleration correction coefficient β2 characteristic curve shown with a broken line is used.

If the actual speed Rs is in the range between the low-speed threshold value SL and the high-speed threshold value SH (SH≧Rs>SL), then because the actual speed Rs is in a medium speed range (medium speed travel range) the acceleration correction coefficient β2 characteristic curve shown with a solid line is used.

If the actual speed Rs is in the range of from 0 to the low-speed threshold value SL (SL≧Rs), then because the actual speed Rs is in a low speed range (low speed travel range) the acceleration correction coefficient β2 characteristic curve shown with the dashed line is used.

From these acceleration correction coefficient maps it can be seen that the acceleration correction coefficient β2 of the motor 33R on the outside of the turn is a value that is less than 1 when the elapsed time Td is 0 and approaches 1 as the time Td elapses. Specifically, the acceleration correction coefficient β2 has an upper limit value set to 1.0.

In the high speed travel range, to make the degree of acceleration of the motor 33R on the outside of the turn large, as shown by the broken line, the acceleration correction coefficient β2 increases from a lower limit value of 0.7 to 1.0 as the time Td elapses from 0 to 500 (msec).

In the medium speed travel range, to make the degree of acceleration of the motor 33R on the outside of the turn medium, as shown by the solid line, the acceleration correction coefficient β2 increases from a lower limit value of 0.8 to 1.0 as the time Td elapses from 0 to 500 (msec).

In the low speed travel range, to make the degree of acceleration of the motor 33R on the outside of the turn small, as shown by the dashed line, the acceleration correction coefficient β2 increases from a lower limit value of 0.9 to 1.0 as the time Td elapses from 0 to 500 (msec).

In ST509 of FIG. 18B, on the basis of the actual speed Rs of the right electric motor 33R at the time when the elapsed time Td is 0 (msec), an acceleration correction coefficient β2 is obtained using one curve selected from the three different characteristic curves.

ST306 in FIG. 16 is a step of controlling the electric motors 33L, 33R in the left turn mode when the vehicle is At Work (i.e. when the snow-removal working part 40 is ON), and is essentially the same as the control of ST305 in FIG. 16. Accordingly, a deceleration correction coefficient α1 for when the vehicle is At Work shown with a dashed line is selected from among the deceleration correction coefficient maps shown in FIG. 8 to FIG. 10.

The drive control method of the left and right electric motors 33L, 33R of the second preferred embodiment is also for example pulse width modulation (PWM), in which pulse voltages are supplied to the motor terminals. In this case, the left and right motor drivers 37L, 37R generate pulse signals with pulse widths controlled in correspondence with the deceleration control signal output values Qdi, Qdo or the acceleration control signal output values Qui, Quo and control the left and right electric motors 33L, 33R with these pulse signals.

As described above, it is a characteristic feature of the control part 56 of the second preferred embodiment that it has deceleration pattern selecting means (ST302, ST303, ST307 of FIG. 16 and ST406 to ST408, ST410 and ST412 of FIG. 17A) for, when it receives a control signal from the left or right turn switch 81L (or 81R), selecting one pattern from among multiple different preset inside motor deceleration patterns (see FIG. 8 to FIG. 10) on the basis of the actual speed Ls (or Rs) of the motor 33L (or 33R) on the inside of the turn when the left or right turn switch 81L (or 81R) was operated, and inside motor deceleration control means (ST415 to ST418 in FIG. 17B) for, only as long as the turn switch 81L (or 81R) is being pressed, executing deceleration control of the motor 33L (or 33R) on the inside of the turn using a deceleration control signal output value Qdi based on the selected inside motor deceleration pattern.

Accordingly, just by simply continuing to press a left or right bush-button turn switch 81L (or 81R) it is possible to decelerate the corresponding motor 33L (or 33R) on the inside of the turn in accordance with a deceleration pattern corresponding to the actual motor speed Ls (or Rs) immediately before the turn. Consequently, compared to a case where the degree of deceleration of the motor 33L (or 33R) on the inside of the turn is adjusted by gripping a lever as in handle-lever type turning control means of related art, extremely simple turning control is possible. The operator can perform turning control easily without needing any skill, and the turning controllability of the vehicle is increased.

Also, because the motor 33L (or 33R) on the inside of the turn is deceleration-controlled with a push-button type turn switch 81L (or 81R), the operating force of the turning control is lightened, and the effort of the operator is further reduced.

Because this turning control means is push-button type turn switches 81L, 81R, its construction is simple compared to handle-lever type turning control means of related art, and adjustment of a lever control level and a control signal level corresponding to this are unnecessary.

The actual motor speed Ls (or Rs) immediately before the turn is set to an optimal speed by the operator himself, taking into account travel conditions such as the road surface and considering the present ground-covering ability of the snow-remover 10. On the basis of this optimal actual motor speed Ls (or Rs), the snow-remover is turned while being decelerated in accordance with a motor deceleration pattern for use on turning. As a result, the ground-covering ability of the snow-remover 10 on turning increases.

It is a characteristic feature of the control part 56 of this invention that, from when it receives a control-release signal at the time when the left or right turn switch 81L (or 81R) is released, it executes acceleration control of the motor 33L (or 33R) on the inside of the turn using an acceleration control signal output value Qui based on a preset motor acceleration pattern (see FIG. 11).

It is a characteristic feature of the acceleration control signal output Qui that it is a value obtained by adding a fixed value Quic to the minimum value Quim of the acceleration control signal output value that would otherwise have been assumed at the time when the control-release signal was received (Qui=Quim+Quic).

Accordingly, from when the turn switch 81L (or 81R) is released, the snow-remover 10 is switched to straight-line travel by acceleration control of the motor 33L (or 33R) on the inside of the turn being carried out with the acceleration control signal.

In this case, the value obtained by adding a fixed value Quic to the minimum value Quim of the acceleration control signal output value is made the acceleration control signal Qui of when control of the turn switch 81L (or 81R) is released. That is, at the time of the switch to straight-line travel, the acceleration control signal output value Qui pertaining to the motor 33L (or 33R) on the inside of the turn is raised at a stroke. As a result, the motor 33L (or 33R) on the inside of the turn is suddenly accelerated. The speed difference between the speed Rs (or Ls) of the motor 33R (or 33L) on the outside of the turn and the speed Ls (or Rs) of the motor 33L (or 33R) on the inside of the turn is rapidly eliminated. Consequently, the snow-remover 10 is swiftly switched from turning travel to straight-line travel. In this way, the snow-remover 10 can be switched easily and swiftly from turning travel to straight-line travel so as to match the operation feel of the operator.

In particular, when the left and right transporting parts 20L, 20R are crawlers, they have a strength of ground contact and size of driving force peculiar to crawlers. Because of this, when the snow-remover 10 is operated to shift from turning travel to straight-line travel, it does not readily do so rapidly. With respect to this, in this invention, by the motor 33L (or 33R) on the inside of the turn being accelerated at a stroke, the speed difference between the left and right crawlers is rapidly eliminated and the switch to straight-line travel can be made quickly.

Also, the snow-remover 10 has a snow-removal working part 40 and a work switch 73 for turning on and off this snow-removal working part 40, and depending on whether the snow-removal working part 40 is on or off the travel resistance of the transporting parts 20L, 20R varies.

It is a characteristic feature of the multiple deceleration patterns for the motor on the inside of the turn (see FIG. 8 to FIG. 10) that the patterns also differ according to whether the work switch 73 is on or off.

It is a characteristic feature of the control part 56 that it is constructed to select one pattern from among multiple deceleration patterns (see FIG. 8 to FIG. 10) on the basis of a combination of the on/off-signal of the work switch 73 and the actual speed Ls (or Rs) of the motor 33L (or 33R) on the inside of the turn as of when the left or right turn switch 81L (or 81R) was operated (ST302 to ST304 and ST307 and ST308 of FIG. 16 and ST406 to ST408, ST410 and ST412 of FIG. 17A).

Therefore, in the case of an snow-remover 10 in which the travel resistance of the transporting parts 20L, 20R varies with whether the snow-removal working part 40 is on or off, as in a snow-remover, it is possible to perform finer turning control by making the multiple inside motor deceleration patterns ones which differ also with whether the work switch 73 is on or off.

It is also a characteristic feature of the control part 56 that it has outside motor deceleration pattern selecting means (ST501 to ST503 of FIG. 18A) for, when receiving an operating signal from the left or right turn switch 81L (or 81R), selecting one deceleration pattern from among a plurality of different preset deceleration patterns for the motor on the outside of the turn (see FIG. 12) on the basis of the actual speed Rs (or Ls) of the motor 33R (or 33L) on the outside of the turn of the time when the left or right turn switch 81L (or 81R) was operated, and also has outside motor deceleration control means (ST504 to ST507 of FIG. 18A) for executing deceleration control of the motor 33R (or 33L) on the outside of the turn, only for as long as the turn switch 81L (or 81R) is being pressed, using a deceleration control signal output Qdo based on the selected outside motor deceleration pattern.

Accordingly, when the snow-remover 10 is turned, because a deceleration pattern of the motor on the outside of the turn is selected on the basis of the actual speed Rs (or Ls) of the motor 33R (or 33L) on the outside of the turn of the time when the turn switch 81L (or 81R) was operated and on the basis of that deceleration pattern the motor 33R (or 33L) on the outside of the turn is also decelerated, the snow-remover 10 can be made to turn more smoothly.

In this second preferred embodiment, by increasing the number of deceleration correction coefficient maps and acceleration correction coefficient maps (the number of different characteristic curves) selected in correspondence with the actual speeds of the electric motors as necessary, it is possible to carry out speed control more finely.

Also, the maps expressing the characteristic curves of the deceleration correction coefficients $\alpha 1$, $\alpha 2$ and the characteristic curves of the acceleration correction coefficients $\beta 1$, $\beta 2$ discussed in the second preferred embodiment are not limited to two-dimensional maps of elapsed time versus correction coefficient. For example, they may alternatively be three-dimensional maps of elapsed time, correction coefficient and actual electric motor speed.

In the first and second preferred embodiments, the maps are preset in internal memory of the control part 56 so that in the steps of the control flow charts described above the maps can be read out as necessary to set correction coefficients. In FIG. 8 to FIG. 13, to facilitate understanding, the maps have been shown schematically, but the forms of the maps are not limited to these and can be set freely.

Also, the characteristic curves of the deceleration correction coefficients $\alpha 1$, $\alpha 2$ and the characteristic curves of the acceleration correction coefficients $\beta 1$ and $\beta 2$ expressed by the maps discussed in the first and second preferred embodiments may alternatively be obtained using computation formulas or the like.

Although in these preferred embodiments the case of a snow-remover has been used as an example of an electric vehicle, the invention is not limited to application to a snow-remover, and can be also be applied for example to some other working machine such as a cultivator or a mower or to an electric vehicle of some other type such as an electric load-carrying vehicle, an electric golf cart or an electric wheelchair.

Obviously, various minor changes and modifications of the present invention are possible in the light of the above teaching. It is therefore to be understood that within the scope of the appended claims the invention may be practiced otherwise than as specifically described.

What is claimed is:

1. An electric vehicle, comprising:
a machine body;
left and right transporting parts provided on the machine body for propelling the machine body;
left and right push-button type turn switches;
left and right electric motors for respectively driving the left and right transporting parts, of which electric motors the one corresponding to whichever of the left and right turn switches is being operated during a turn will be called the motor on the inside of the turn and the other will be called the motor on the outside of the turn;
a control part for controlling the left and right electric motors; and
a hand-operated target speed adjusting member for producing a target travel speed command for the left and right electric motors,
wherein the control part comprises:
inside motor deceleration pattern selecting means for, when receiving an operation signal from the left or right turn switch, selecting one deceleration pattern from among multiple different preset deceleration patterns for the motor on the inside of the turn on the basis of a target travel speed from the target speed adjusting member as of when said left or right turn switch was operated; and
inside motor deceleration control means for, only as long as said turn switch is being operated, executing deceleration control of the motor on the inside of the turn using a deceleration control value based on the selected inside motor deceleration pattern.

2. An electric vehicle according to claim 1, wherein the control part further comprises inside motor acceleration control means for, from when it receives a control-release signal of when the left or right turn switch was released, executing acceleration control of the motor on the inside of the turn using an acceleration control value based on a preset motor acceleration pattern, and the acceleration control value is a value obtained by adding a fixed value to a minimum value of the acceleration control value that would otherwise have been assumed at the time when the control-release signal was received.

3. An electric vehicle according to claim 1, further comprising a working part and a work switch for on/off-controlling this working part, the resistance to travel encountered by the left and right transporting parts differing depending on whether the working part is on or off, wherein the multiple inside motor deceleration patterns also differ according to whether the working switch is on or off and the control part selects one pattern from among the multiple inside motor deceleration patterns on the basis of a combination of an on/off-signal from the work switch and said target travel speed as of when said left or right turn switch was operated.

4. An electric vehicle according to claim 1, wherein the control part further comprises:
outside motor deceleration pattern selecting means for, when receiving an operation signal from the left or right turn switch, selecting one pattern from among multiple different preset deceleration patterns for the motor on the outside of the turn on the basis of said target travel speed as of when said left or right turn switch was operated; and
outside motor deceleration control means for, only as long as said turn switch is being operated, executing deceleration control of the motor on the outside of the turn using a deceleration control value based on the selected outside motor deceleration pattern.

5. An electric vehicle according to claim 3, wherein the control part further comprises:
outside motor deceleration pattern selecting means for, when receiving an operation signal from the left or right turn switch, selecting one pattern from among multiple different preset deceleration patterns for the motor on the outside of the turn on the basis of said target travel speed as of when said left or right turn switch was operated; and
outside motor deceleration control means for, only as long as said turn switch is being operated, executing deceleration control of the motor on the outside of the turn using a deceleration control value based on the selected outside motor deceleration pattern.

6. An electric vehicle according to claim 2, further comprising a working part such as a snow-removing working part and a work switch for on/off-controlling this working part, the resistance to travel encountered by the left and right transporting parts differing depending on whether the working part is on or off, wherein the multiple inside motor deceleration patterns also differ according to whether the working switch is on or off and the control part selects one pattern from among the multiple inside motor deceleration patterns on the basis of a combination of an on/off-signal from the work switch and said target travel speed as of when said left or right turn switch was operated.

7. An electric vehicle according to claim 2, wherein the control part further comprises:
outside motor deceleration pattern selecting means for, when receiving an operation signal from the left or right turn switch, selecting one pattern from among multiple different preset deceleration patterns for the motor on the outside of the turn on the basis of said target travel speed as of when said left or right turn switch was operated; and
outside motor deceleration control means for, only as long as said turn switch is being operated, executing deceleration control of the motor on the outside of the turn using a deceleration control value based on the selected outside motor deceleration pattern.

8. An electric vehicle according to claim 6, wherein the control part further comprises:
outside motor deceleration pattern selecting means for, when receiving an operation signal from the left or right turn switch, selecting one pattern from among multiple different preset deceleration patterns for the motor on the outside of the turn on the basis of said target travel speed as of when said left or right turn switch was operated; and
outside motor deceleration control means for, only as long as said turn switch is being operated, executing deceleration control of the motor on the outside of the turn using a deceleration control value based on the selected outside motor deceleration pattern.

9. An electric vehicle, comprising:
a machine body;
left and right transporting parts provided on the machine body for propelling the machine body;
left and right push-button type turn switches;
left and right electric motors for respectively driving the left and right transporting parts, of which electric motors the one corresponding to whichever of the left and right turn switches is being operated during a turn will be called the motor on the inside of the turn and the other will be called the motor on the outside of the turn; and
a control part for controlling the left and right electric motors,
wherein the control part comprises:
inside motor deceleration pattern selecting means for, when receiving an operation signal from the left or right turn switch, selecting one deceleration pattern from among multiple different preset deceleration patterns for the motor on the inside of the turn on the basis of the actual speed of the motor on the inside of the turn as of when said left or right turn switch was operated; and
inside motor deceleration control means for, only as long as said turn switch is being operated, executing deceleration control of the motor on the inside of the turn using a deceleration control value based on the selected inside motor deceleration pattern.

10. An electric vehicle according to claim 9, wherein the control part further comprises inside motor acceleration control means for, from when it receives a control-release signal of when the left or right turn switch was released, executing acceleration control of the motor on the inside of the turn using an acceleration control value based on a preset motor acceleration pattern, the acceleration control value is a value obtained by adding a fixed value to a minimum value of the acceleration control value that would otherwise have been assumed at the time when the control-release signal was received.

11. An electric vehicle according to claim 9, further comprising a working part and a work switch for on/off-controlling this working part, the resistance to travel encountered by the left and right transporting parts differing depending on whether the working part is on or off, wherein the multiple inside motor deceleration patterns differ also according to whether the working switch is on or off, and the control part selects one pattern from among the multiple inside motor deceleration patterns on the basis of a combination of an on/off-signal from the work switch and said actual speed of the motor on the inside of the turn as of when said left or right turn switch was operated.

12. An electric vehicle according to claim 9, wherein the control part further comprises:
outside motor deceleration pattern selecting means for, when receiving an operation signal from the left or right turn switch, selecting one pattern from among multiple different preset deceleration patterns for the motor on the outside of the turn on the basis of the actual travel speed of the motor on the outside of the turn as of when said left or right turn switch was operated; and
outside motor deceleration control means for, only as long as said turn switch is being operated, executing deceleration control of the motor on the outside of the turn using a deceleration control value based on the selected outside motor deceleration pattern.

13. An electric vehicle according to claim 10, further comprising a working part such as a snow-removing working part and a work switch for on/off-controlling this working part, the resistance to travel encountered by the left and right transporting parts differing depending on whether the working part is on or off, wherein the multiple inside motor deceleration patterns also differ according to whether the working switch is on or off and the control part selects one pattern from among the multiple inside motor deceleration patterns on the basis of a combination of an on/off-signal from the work switch and said actual speed of the motor on the inside of the turn as of when said left or right turn switch was operated.

14. An electric vehicle according to claim 10, wherein the control part further comprises:
outside motor deceleration pattern selecting means for, when receiving an operation signal from the left or right turn switch, selecting one pattern from among multiple different preset deceleration patterns for the motor on the outside of the turn on the basis of the actual speed of the motor on the outside of the turn as of when said left or right turn switch was operated; and
outside motor deceleration control means for, only as long as said turn switch is being operated, executing deceleration control of the motor on the outside of the turn using a deceleration control value based on the selected outside motor deceleration pattern.

15. An electric vehicle according to claim 13, wherein the control part further comprises:
outside motor deceleration pattern selecting means for, when receiving an operation signal from the left or right turn switch, selecting one pattern from among multiple different preset deceleration patterns for the motor on the outside of the turn on the basis of the actual speed of the motor on the outside of the turn as of when said left or right turn switch was operated; and
outside motor deceleration control means for, only as long as said turn switch is being operated, executing deceleration control of the motor on the outside of the turn using a deceleration control value based on the selected outside motor deceleration pattern.

* * * * *